(12) United States Patent
Uchimura et al.

(10) Patent No.: US 8,569,406 B2
(45) Date of Patent: Oct. 29, 2013

(54) POLYCARBONATE RESIN, COMPOSITION OF SAID RESIN, AND MOLDED ARTICLE OF SAID RESIN

(71) Applicants: Ryuuji Uchimura, Kitakyushu (JP); Kazuyuki Takahashi, Chigasaki (JP); Kenji Tsuruhara, Kitakyushu (JP); Tomonari Yokoyama, Ashigarashimo-gun (JP)

(72) Inventors: Ryuuji Uchimura, Kitakyushu (JP); Kazuyuki Takahashi, Chigasaki (JP); Kenji Tsuruhara, Kitakyushu (JP); Tomonari Yokoyama, Ashigarashimo-gun (JP)

(73) Assignees: Mitsubishi Chemical Corporation, Tokyo (JP); Mitsubishi Engineering Plastics Corporation, Tokyo (JP)

( * ) Notice: Subject to any disclaimer, the term of this patent is extended or adjusted under 35 U.S.C. 154(b) by 0 days.

(21) Appl. No.: 13/632,296

(22) Filed: Oct. 1, 2012

(65) Prior Publication Data

US 2013/0030094 A1  Jan. 31, 2013

Related U.S. Application Data

(63) Continuation of application No. PCT/JP2011/058339, filed on Mar. 31, 2011.

(30) Foreign Application Priority Data

Mar. 31, 2010  (JP) .................................. 2010-083181
May 14, 2010  (JP) .................................. 2010-112648

(51) Int. Cl.
*C08K 5/521* (2006.01)

(52) U.S. Cl.
USPC .......................... 524/127; 524/156; 524/464

(58) Field of Classification Search
USPC ........................................... 524/127, 156, 464
See application file for complete search history.

(56) References Cited

FOREIGN PATENT DOCUMENTS

| JP | 7-70304 | 3/1995 |
|---|---|---|
| JP | 2003-49061 A | 2/2003 |
| JP | 2010-43201 | 2/2010 |
| JP | 2010-168420 | 8/2010 |
| JP | 2010-188719 | 9/2010 |

OTHER PUBLICATIONS

International Search Report issued in PCT/JP2011/058339, dated May 10, 2011.

*Primary Examiner* — Peter Szekely
(74) *Attorney, Agent, or Firm* — Oblon, Spivak, McClelland, Maier & Neustadt, L.L.P.

(57) ABSTRACT

To provide a polycarbonate resin composition having improved flame retardancy and moldability.
A polycarbonate resin having a ratio of the melt viscosity $\eta_{10}$ measured at 300° C. at a shear rate of 10 sec$^{-1}$ to the melt viscosity $\eta_{1000}$ measured at 300° C. at a shear rate of 1000 sec$^{-1}$ ($\eta_{10}/\eta_{1000}$) of at least 3 and at most 8, a branch parameter $G=[\eta]/[\eta]$lin of at least 0.80 and at most 0.94, and a pencil hardness of at least HB.

19 Claims, No Drawings

POLYCARBONATE RESIN, COMPOSITION OF SAID RESIN, AND MOLDED ARTICLE OF SAID RESIN

CROSS-REFERENCE TO RELATED APPLICATIONS

This application is a Continuation of PCT/JP2011/058339 filed on Mar. 31, 2011. This application is based upon and claims the benefit of priority to Japanese Application No. 2010-083181 filed on Mar. 31, 2010, to Japanese Application No. 2010-112648 filed on May 14, 2010, the contents of which are incorporated herein by reference in their entirety.

BACKGROUND OF THE INVENTION

1. Technical Field

The present invention relates to a polycarbonate resin having favorable flame retardancy and moldability, a polycarbonate resin composition and a molded article of polycarbonate resin.

2. Background Art

Polycarbonate resins have been widely used for applications of e.g. office automation equipment and home electric appliances. In such application fields, it has been strongly desired to make synthetic resin materials have flame retardancy, and therefore, various flame retarding techniques have been studied.

For example, Patent Document 1 discloses a polycarbonate resin composition having a flame retardant blended with a polycarbonate resin having specific melt viscoelasticity obtainable by a melt method. That is, it discloses a polycarbonate resin composition which is a polycarbonate resin composition having a flame retardant blended in an amount of from 0.01 to 30 parts by weight per 100 parts by weight of a polycarbonate obtainable by a melt method, wherein the loss angle $\delta$ and the complex viscosity $\eta^*$ (Pa·s) of the polycarbonate measured at a temperature of 250° C. at an angular velocity of 10 rad/s satisfy the relational expression $2500 \leq \tan\delta/\eta^{*-0.87} \leq 6000$.

Further, a polycarbonate resin is required to have favorable moldability to obtain molded articles suitable for various applications, in addition to have the flame retardancy. For example, in a case of obtaining a thin product by an injection molding method, fluidity suitable for injection molding is required.

Prior Art Document
Patent Documents
    Patent Document 1: JP-A-2003-049061

DISCLOSURE OF INVENTION

Technical Problem

The object of the present invention is to provide a polycarbonate resin excellent in the flame retardancy and the moldability, a polycarbonate resin composition and a molded article of polycarbonate resin.

Solution to Problem

The present invention is to achieve the above objects, and provides the following.

[1] A polycarbonate resin which has a ratio of the melt viscosity $\eta_{10}$ measured at 300° C. at a shear rate of 10 sec$^{-1}$ to the melt viscosity $\eta_{1000}$ measured at 300° C. at a shear rate of 1,000 sec$^{-1}$ ($\eta_{10}/\eta_{1000}$) of at least 3 and at most 8, a branch parameter $G=[\eta]/[\eta]$lin of at least 0.80 and at most 0.94, and a pencil hardness of at least HB;

provided that $[\eta]$ is the intrinsic viscosity (dl/g) of the polycarbonate resin in a methylene chloride solvent at 20° C., and $[\eta]$lin is the intrinsic viscosity in a methylene chloride solvent at 20° C. of a linear polycarbonate having the same weight average molecular weight as the polycarbonate resin as measured by a GPC method using a general purpose calibration curve.

[2] The polycarbonate resin according to the above [1], which has structural units represented by the following formula (1):

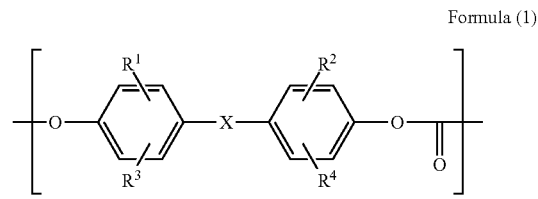

Formula (1)

wherein X is a single bond, a substituted or non-substituted alkylene group, a substituted or non-substituted alkylidene group, an oxidized or non-oxidized sulfur atom, or an oxygen atom, each of $R^1$ and $R^2$ which are independent of each other, is a substituted or non-substituted $C_{1-20}$ alkyl group or a substituted or non-substituted aryl group, and each of $R^3$ and $R^4$ which are independent of each other, is a hydrogen atom, a substituted or non-substituted $C_{1-20}$ alkyl group, or a substituted or non-substituted aryl group.

[3] The polycarbonate resin according to the above [2], wherein in the formula (1), each of $R^1$ and $R^2$ is a methyl group bonded to the carbon atom at the 2-position of the phenoxy group, each of $R^3$ and $R^4$ is a hydrogen atom bonded to the carbon atom at the 6-position of the phenoxy group, and X is an isopropylidene group.

[4] The polycarbonate resin according to any one of the above [1] to [3], wherein the polycarbonate resin has structural units represented by the following formula (2):

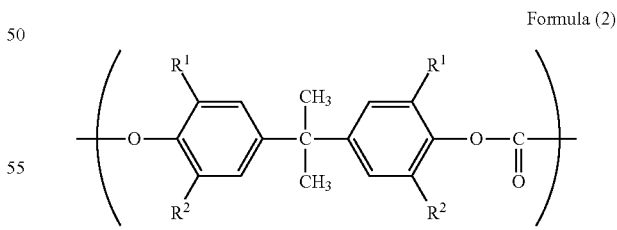

Formula (2)

wherein each of $R^1$ and $R^2$ which are independent of each other, is a substituted or non-substituted $C_{1-20}$ alkyl group, or a substituted or non-substituted aryl group.

[5] The polycarbonate resin according to any one of the above [1] to [4], wherein the polycarbonate resin is obtained by an ester exchange method of an aromatic dihydroxy compound represented by the following formula (3) and a carbonic diester:

Formula (3)

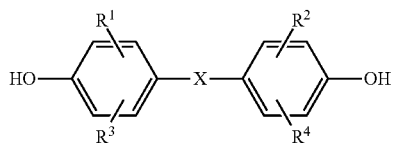

wherein $R^1$, $R^2$, $R^3$, $R^4$ and X are as defined in the formula (1).

[6] A polycarbonate resin composition, which comprises the polycarbonate resin as defined in any one of the above [1] to [5], and a polycarbonate resin having structural units represented by the following formula (4):

Formula (4)

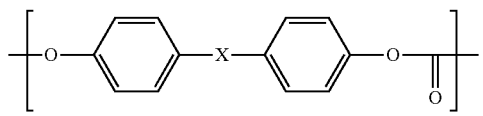

wherein X is as defined in the formula (1).

[7] The polycarbonate resin composition according to the above [6], wherein the content of the polycarbonate resin as defined in any one of the above [1] to [5] is from 1 to 45 wt % in the polycarbonate resin composition.

[8] A flame retardant-containing polycarbonate resin composition, which comprises the polycarbonate resin as defined in any one of the above [1] to [5], or the polycarbonate resin composition as defined in the above [6] or [7], and a flame retardant.

[9] The flame retardant-containing polycarbonate resin composition according to the above [8], wherein the flame retardant is at least one member selected from the group consisting of a metal sulfonate type flame retardant, a halogen-containing compound type flame retardant and a phosphorus-containing compound type flame retardant.

[10] The flame retardant-containing polycarbonate resin composition according to the above [9], wherein the metal sulfonate type flame retardant is added in an amount of from 0.04 to 0.3 part by weight per 100 parts by weight of the polycarbonate resin or the polycarbonate resin composition.

[11] The flame retardant-containing polycarbonate resin composition according to the above [9], wherein the halogen-containing compound type flame retardant is added in an amount of from 5 to 30 parts by weight per 100 parts by weight of the polycarbonate resin or the polycarbonate resin composition.

[12] The flame retardant-containing polycarbonate resin composition according to the above [9], wherein the phosphorus-containing compound type flame retardant is added in an amount of from 3 to 15 parts by weight per 100 parts by weight of the polycarbonate resin or the polycarbonate resin composition.

[13] A molded article of polycarbonate resin obtained by molding the flame retardant-containing polycarbonate resin composition as defined in any one of the above [8] to [12], which satisfies the V-0 classification in the flammability test of UL94 with respect to a test specimen having a thickness of at most 2 mm, which has a haze of at most 1.0 with respect to a test specimen having a thickness of 3 mm based on the standard of JIS K7136, and which has a surface hardness of at least HB.

Advantageous Effects of Invention

According to the present invention, by using a polycarbonate resin containing a polycarbonate resin having a melt viscosity ratio ($\eta_{10}/\eta_{1000}$) of at least 3 and at most 8 and a pencil hardness of at least HB, a molded article of polycarbonate resin having favorable flame retardancy and moldability can be obtained.

DESCRIPTION OF EMBODIMENTS

Now, the present invention will be described in detail below. It should be understood that the present invention is by no means restricted to the following description and embodiments, and various modifications are possible within the scope of the present invention.

<Polycarbonate Resin and Polycarbonate Resin Composition>

The polycarbonate resin of the present invention has the above-described properties, and the polycarbonate resin composition comprises the polycarbonate resin and a specific flame retardant. Now, the respective requirements will be described below.

(Polycarbonate Resin)

The polycarbonate resin of the present invention is characterized by having a ratio of the melt viscosity $\eta_{10}$ (Pa·s) measured at 300° C. at a shear rate of 10 sec$^{-1}$ to the melt viscosity $\eta_{1000}$ (Pa·s) measured at 300° C. at a shear rate of 1,000 sec$^{-1}$ ($\eta_{10}/\eta_{1000}$) of at least 3 and at most 8 ($3 \leq (\eta_{10}/\eta_{1000}) \leq 8$).

In the present invention, the melt viscosity of a polycarbonate resin by Capirograph is measured by using a capillary rheometer "Capirograph 1C" (manufactured by TOYO SEIKI SEISAKU-SHO, LTD.) with a die of 1 mm in diameter×10 mm in length, for a retention time of 5 minutes at a measurement temperature of 300° C. at a shear rate $\gamma$=9.12 sec$^{-1}$ to 1824 sec$^{-1}$, to determine $\eta_{10}$ and $\eta_{1000}$ of the polycarbonate resin. Further, for measurement of the melt viscosity of a polycarbonate resin to be used in the present invention, the polycarbonate resin used for measurement is one preliminarily dried at 80° C. for 5 hours.

In the present invention, the melt viscosity $\eta_{10}$ corresponds to the melt viscosity of the polycarbonate resin at the time of burning in the flammability test as described hereinafter. It is considered that the higher the melt viscosity $\eta_{10}$ is, the less the fire source will fall at the time of burning and the less the fire spreading will occur.

The melt viscosity $\eta_{10}$ of the polycarbonate resin of the present invention is usually at least 8,000, preferably at least 10,000. Further, the melt viscosity $\eta_{10}$ is usually at most 100,000, preferably at most 50,000.

If the melt viscosity $\eta_{10}$ is excessively low, the fire source tends to easily fall at the time of burning. If the melt viscosity $\eta_{10}$ is excessively high, as the viscosity at the time of kneading by an extruder tends to be high, dispersion failure of additives is likely to occur, or the motor load of the extruder tends to be too high, thus leading to troubles.

In the present invention, the melt viscosity $\eta_{1000}$ corresponds to the melt viscosity of the polycarbonate resin at the time of injection molding for example. It is considered that the lower the melt viscosity $\eta_{1000}$ is, the better the fluidity at the time of molding.

The melt viscosity $\eta_{1000}$ of the polycarbonate resin of the present invention is usually at most 10,000, preferably at most 5,000. Further, the melt viscosity $\eta_{1000}$ is usually at least 1,000, preferably at least 2,000. If the melt viscosity $\eta_{1000}$ is excessively low, the mechanical strength tends to be poor. If the melt viscosity $\eta_{1000}$ is excessively high, the moldability tend to be deteriorated due to insufficient fluidity.

The polycarbonate resin of the present invention is characterized by having a ratio of the melt viscosity $\eta_{10}$ to the melt viscosity $\eta_{1000}$ ($\eta_{10}/\eta_{1000}$) of at least 3 and at most 8 ($3 \leq (\eta_{10}/\eta_{1000}) \leq 8$).

Here, the ratio of the melt viscosity $\eta_{10}$ to the melt viscosity $\eta_{1000}$ ($\eta_{10}/\eta_{1000}$) has a technical significance as an index of the balance between the flame retardancy and the moldability of a polycarbonate resin composition having the polycarbonate resin and a flame retardant blended. That is, the melt viscosity $\eta_{1000}$ at a high shear rate may be a factor to control the moldability at the time of molding a polycarbonate resin composition. Further, the melt viscosity $\eta_{10}$ at a low shear rate may be a factor to control the flame retardancy in the flammability test of a polycarbonate resin composition.

In the present invention, the ratio ($\eta_{10}/\eta_{1000}$) is at least 3, preferably at least 4, and the ratio ($\eta_{10}/\eta_{1000}$) is at most 8, preferably at most 6. If the ratio ($\eta_{10}/\eta_{1000}$) is excessively low, the flame retardancy and the moldability tend to be poor. If the ratio ($\eta_{10}/\eta_{1000}$) is excessively high, easiness at the time of extrusion kneading and the mechanical strength tend to be poor.

The polycarbonate resin of the present invention may be one having at least structural units represented by the following formula (1) in its molecule:

Formula (1)

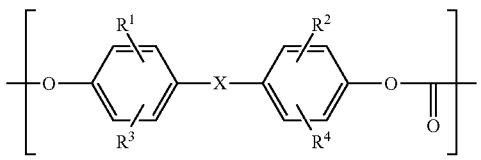

wherein each of $R^1$ and $R^2$ which are independent of each other, is a substituted or non-substituted $C_{1-20}$ alkyl group or a substituted or non-substituted aryl group, each of $R^3$ and $R^4$ which are independent of each other, is a hydrogen atom, a substituted or non-substituted $C_{1-20}$ alkyl group or a substituted or non-substituted aryl group, provided that the number of carbon atoms in $R^1$, $R^2$, $R^3$ and $R^4$ is the number of carbon atoms in an alkyl group moiety excluding the substituent, and X is a single bond, a substituted or non-substituted alkylene group, a substituted or non-substituted alkylidene group, an oxidized or non-oxidized sulfur atom, or an oxygen atom.

As each of $R^1$ and $R^2$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group. The substituted or non-substituted aryl group may, for example, be a phenyl, benzyl, tolyl, 4-methylphenyl or naphthyl group.

As each of $R^3$ and $R^4$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group, and the substituted or non-substituted aryl group may, for example, be a phenyl, benzyl, tolyl, 4-methylphenyl or naphthyl group.

Among them, each of $R^1$ and $R^2$ is preferably a methyl, ethyl, n-propyl or 4-methylphenyl group, particularly preferably a methyl group. Each of $R^3$ and $R^4$ is preferably a hydrogen atom, a methyl, ethyl, n-propyl or 4-methylphenyl group, particularly preferably a hydrogen atom.

Here, the bonding positions of $R^1$, $R^2$, $R^3$ and $R^4$ in the formula (1) are optional positions selected from 2-, 3-, 5- and 6-positions relative to X on the phenyl rings. Among them, 3-position or 5-position relative to X is preferred.

In the formula (1), X is a single bond, a substituted or non-substituted alkylene group, a substituted or non-substituted alkylidene group, a substituted or non-substituted sulfur atom, or an oxygen atom. The oxidized or not-oxidized sulfur atom may, for example, be —S— or —SO$_2$—.

The substituted or non-substituted alkylene group and the substituted or non-substituted alkylidene group are shown below.

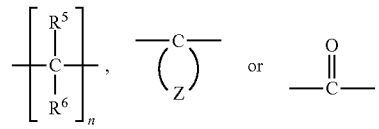

wherein each of $R^5$ and $R^6$ which are independent of each other, is a hydrogen atom, a substituted or non-substituted $C_{1-20}$ alkyl group or a substituted or non-substituted aryl group, and Z is a substituted or non-substituted $C_{4-20}$ alkylene group or a polymethylene group, and n is an integer of from 1 to 10.

As each of $R^5$ and $R^6$, the substituted or non-substituted $C_{1-20}$ alkyl group may, for example, be a methyl, ethyl, n-propyl, isopropyl, n-butyl, isobutyl, sec-butyl, tert-butyl, n-pentyl, sec-pentyl, n-hexyl, n-heptyl or n-octyl group. The substituted or non-substituted aryl group may, for example, be a phenyl, benzyl, tolyl, 4-methylphenyl or naphthyl group.

Among them, each of $R^5$ and $R^6$ is preferably a methyl, ethyl, n-propyl or 4-methylphenyl group, more preferably a methyl group, and it is particularly preferred that both of $R^5$ and $R^6$ are methyl groups and n is 1, that is, X in the formula (1) is an isopropylidene group.

Z in the formula (1) is bonded to the carbon atom bonding the two phenyl groups, and forms a substituted or non-substituted bivalent carbon ring. The bivalent carbon ring may, for example, be a (preferably $C_{5-8}$) cycloalkylidene group such as a cyclopentylidene, cyclohexylidene, cycloheptylidene, cyclododecylidene or adamantylidene group. The substituted carbon ring may, for example, be such a group having a methyl substituent or an ethyl substituent. Among them, preferred is a cyclohexylidene group or a methyl-substituted cyclohexylidene group.

The polycarbonate resin used in the present invention is preferably one having 2,2-bis(3-methyl-4-hydroxyphenyl)propane structural units, i.e. structural units wherein each of $R^1$ and $R^2$ is a methyl group at the 3-position relative to X, and each of $R^3$ and $R^4$ is a hydrogen atom, as a specific example of the aromatic dihydroxy compound represented by the formula (1), or structural units represented by the following formula (2):

Formula (2)

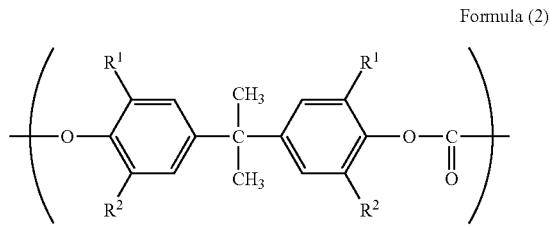

wherein each of $R^1$ and $R^2$ which are independent of each other, is a substituted or non-substituted $C_{1-20}$ alkyl group, or a substituted or non-substituted aryl group, and they are the same as $R^1$ and $R^2$ in the above-described formula (1).

Among them, the polycarbonate resin used in the present invention is particularly preferably one having 2,2-bis(3-methyl-4-hydroxyphenyl)propane structural units.

The polycarbonate resin of the present invention has at least structural units represented by the formula (1), and their content is preferably at least 30 wt %, more preferably at least 40 wt %, further preferably at least 50 wt %, in the entire polycarbonate resin. If the amount of the structural units represented by the formula (1) is excessively small, the surface hardness and the fluidity tend to be poor.

The polycarbonate resin to which the present invention is applicable is particularly preferably one which satisfies the following properties (a) to (e).

(a) The intrinsic viscosity [η] (dl/g) in a methylene chloride solvent at 20° C. is within a range of at least 0.40 and at most 2.0. Further, the intrinsic viscosity [η](dl/g) is preferably from 0.50 to 1.00, particularly preferably from 0.50 to 0.80. If the intrinsic viscosity [η] is excessively small, the mechanical strength tends to be poor, and if the intrinsic viscosity [η] is excessively high, the melt fluidity tends to be deteriorated, and the moldability tend to be poor.

(b) The branch parameter $G=[\eta]/[\eta]_{lin}$ is within a range of at least 0.8 and at most 0.94. Further, the branch parameter G is particularly preferably at least 0.81 and at most 0.9. If the branch parameter G is excessively small, the melt tension tends to be too high, and the fluidity tends to be decreased, and if the branch parameter G is excessively large, the polycarbonate resin may behave as a Newtonian fluid in a molten state, whereby the moldability tend to be insufficient.

Here, $[\eta]_{lin}$ is the intrinsic viscosity in a methylene chloride solvent at 20° C. of a linear polycarbonate having the same weight average molecular weight as measured by a light scattering method or a GPC method using a general purpose calibration curve.

In the present invention, it is a value calculated based on a viscosity equation obtained from the intrinsic viscosity and the weight average molecular weight of a polycarbonate resin (linear polycarbonate) obtained by an interfacial polymerization method from an aromatic dihydroxy compound and carbonyl chloride without using a branching agent.

In the present invention, the branch parameter G is calculated by the following method. That is, the intrinsic viscosity [η] of the polycarbonate resin measured by the above method is divided by the intrinsic viscosity $[\eta]_{lin}$ of the linear polycarbonate having the same weight average molecular weight to calculate the branch parameter G of the polycarbonate resin.

As $[\eta]_{lin}$, the intrinsic viscosity of the polycarbonate resin produced by an interfacial polycondensation method without using a branching agent is measured, which is regarded as the intrinsic viscosity $[\eta]_{lin}$ of the linear polycarbonate. Further, the weight average molecular weight (Mw) of the linear polycarbonate having the intrinsic viscosity $[\eta]_{lin}$ is calculated from a molecular weight/viscosity relational expression determined from the intrinsic viscosity [η] and the molecular weight calculated as standard polystyrene preliminarily obtained from the results of GPC measurement of the polycarbonate resin.

(c) The value obtained by dividing the logarithm $\ln \eta_{10}$ of the melt viscosity $\eta_{10}$ by the intrinsic viscosity [η] (dl/g) in a methylene chloride solvent at 20° C. ($\ln \eta_{10}/[\eta]$) is at most 14.0, and the value obtained by dividing the logarithm $\ln \eta_{1000}$ of the above melt viscosity $\eta_{1000}$ by the intrinsic viscosity [η] (dl/g) in a methylene chloride solvent at 20° C. ($\ln \eta_{1000}/[\eta]$) is at most 11.0.

($\ln \eta_{10}/[\eta]$) and ($\ln \eta_{1000}/[\eta]$) preferably satisfy the above ranges simultaneously. If they are out of the above ranges, the balance between the fluidity and the moldability tends to be impaired. The lower limits of ($\ln \eta_{10}/[\eta]$) and ($\ln \eta_{1000}/[\eta]$) are not particularly limited, but practically, ($\ln \eta_{10}/[\eta]$) is more preferably within a range of from 11.0 to 14.0, and ($\ln \eta_{1000}/[\eta]$) is more preferably within a range of from 8.0 to 11.0.

($\ln \eta_{10}/[\eta]$) and ($\ln \eta_{1000}/[\eta]$) are indices indicating the fluidity. For example, even polycarbonate resins having the same intrinsic viscosity (=molecular weight) may have different melt viscosities in some cases. In a case where the molded articles are to be thin, a material having good fluidity while maintaining the mechanical strength is required. With respect to the mechanical strength, the ratio of the melt viscosity ($\eta_{10}$) in a low shear rate range to the intrinsic viscosity ([η])($\ln \eta_{10}/[\eta]$) is preferably adjusted to be within the above range. On the other hand, with respect to the fluidity, the ratio of the melt viscosity ($\ln \eta_{1000}$) in a high shear rate region to the intrinsic viscosity ([η]) ($\ln \eta_{1000}/[\eta]$) is preferably adjusted to be within the above range.

In the present invention, $\ln \eta_{10}/[\eta]$ and $\ln \eta_{1000}/[\eta]$ are calculated by the following method. That is, the melt viscosity of a polycarbonate resin dried at from 80 to 130° C. for 5 hours is measured by using a capillary rheometer "Capirograph 1C" (manufactured by TOYO SEIKI SEI-SAKU-SHO, LTD.) equipped with a die of 1 mm in diameter×30 mm in length at 300° C. within a shear rate γ=9.12 to 1824 (sec$^{-1}$), and the melt viscosity $\eta_{10}$ at a shear rate of 10 sec$^{-1}$ and the melt viscosity $\eta_{1000}$ at a shear rate of 1000 sec$^{-1}$ are respectively read, and their ratios to the preliminarily measured intrinsic viscosity [η] ($\ln \eta_{10}/[\eta]$ and $\ln \eta_{1000}/[\eta]$) are calculated.

(d) The ratio of the weight average molecular weight Mw to the number average molecular weight Mn (Mw/Mn) calculated as polystyrene measured by gel permeation chromatography (GPC) is preferably within a range of at least 3.0 and at most 5.0. Further, (Mw/Mn) is more preferably within a range of at least 3.0 and at most 4.0. If (Mw/Mn) is excessively low, the fluidity in a molten state tends to be increased, and the moldability tend to be decreased. On the other hand, if (Mw/Mn) is excessively high, the melt viscosity tends to be increased, and the molding tends to be difficult.

(e) The pencil hardness in accordance with ISO 15184 is at least HB. Further, the pencil hardness of the polycarbonate resin is preferably at least F, more preferably at least H. However, it is usually at most 3H. Of a polycarbonate resin having a pencil hardness less than HB, the surface is likely to be scarred, and a conventional bisphenol A type polycarbonate resin has a pencil hardness of 2B and is insufficient.

The terminal hydroxy group concentration of the polycarbonate resin of the present invention is not particularly limited. In a case where the after-mentioned ester exchange method is employed as the production method, the terminal hydroxy group concentration of the obtainable polycarbonate resin is usually at least 100 ppm, preferably at least 200 ppm, more preferably at least 300 ppm. Further, it is usually at most 2,000 ppm, preferably at most 1,800 ppm, further preferably at most 1,200 ppm. If the terminal hydroxy group concentration of the polycarbonate resin is excessively low, the initial hue at the time of molding tends to be deteriorated. If the terminal hydroxy group concentration is excessively high, the lasting thermal stability tends to be decreased.

<Method for Producing Polycarbonate Resin>

Now, the method for producing the polycarbonate resin of the present invention will be described. As the method for producing the polycarbonate resin, melt polycondensation (melt method) based on an ester exchange reaction of an aromatic dihydroxy compound and a carbonic diester and an interfacial method by interfacial polycondensation of an aromatic dihydroxy compound and carbonyl chloride may be mentioned. Among them, a melt method is preferred.
(Aromatic Dihydroxy Compound)

As the aromatic dihydroxy compound, in both of the melt method (ester exchange method) and the interfacial method, an aromatic dihydroxy compound represented by the following formula (3) is preferably contained:

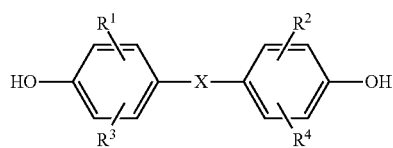

Formula (3)

wherein $R^1$, $R^2$, $R^3$, $R^4$ and X are as defined in the above formula (1).

The aromatic dihydroxy compound represented by the formula (3) may, for example, be 2,2-bis(3-methyl-4-hydroxyphenyl)propane, 2,2-bis(3,5-dimethyl-4-hydroxyphenyl)propane, 1,1-bis(4-hydroxy-3-methylphenyl)cyclohexane, 1,1-bis(4-hydroxy-3-methylphenyl)-3,5,5-trimethylcyclohexane, 1,1-bis(4-hydroxy-3-methylphenyl)adamantane, 1,4-bis(4-hydroxy-3-methylphenyl)adamantane, 2,2-bis(4-hydroxy-3-ethylphenyl)propane, 2,2-bis(4-hydroxy-3-tert-butylphenyl)propane, 2,2-bis(4-hydroxy-3-cyclohexylphenyl)propane, 2,2-bis(4-hydroxy-3-phenylphenyl)propane, 5,5-bis(4-hydroxy-3-methylphenyl)hexahydro-4,7-methanoindane, 2,2-bis(4-hydroxy-3-methylphenyl)sulfone, 2,2-bis(4-hydroxy-3-methylphenyl)sulfide, 3,3'-dimethylbiphenol, 2,2-bis(4-hydroxy-3,5-dimethylphenyl)propane, 1,1-bis(4-hydroxy-3,5-dimethylphenyl)cyclohexane, 1,1-bis(4-hydroxy-3,5-dimethylphenyl)-3,5,5-trimethylcyclohexane, 1,1-bis(4-hydroxy-3,5-dimethylphenyl)adamantane, 1,4-bis(4-hydroxy-3,5-dimethylphenyl)adamantane, 2,2-bis(3-ethyl-4-hydroxy-5-methylphenyl)propane, 2,2-bis(3-tert-butyl-4-hydroxy-5-methylphenyl)propane, 2,2-bis(3-cyclohexyl-4-hydroxy-5-methylphenyl)propane, 2,2-bis(4-hydroxy-3-methyl-5-phenylphenyl)propane, 2,2-bis(3,5-diethyl-4-hydroxyphenyl)propane, 2,2-bis(3,5-di-tert-butyl-4-hydroxyphenyl)propane, 2,2-bis(3,5-di-cyclohexyl-4-hydroxyphenyl)propane, 2,2-bis(4-hydroxy-3,5-diphenylphenyl)propane, 5,5-bis(4-hydroxy-3,5-dimethylphenyl)hexahydro-4,7-methanoindane, 2,2-bis(4-hydroxy-3,5-dimethylphenyl)sulfone, 2,2-bis(4-hydroxy-3,5-dimethylphenyl)sulfide or 3,3',5,5'-tetramethylbiphenol.

Among them, 2,2-bis(4-hydroxy-3-methylphenyl)propane, 1,1-bis(4-hydroxy-3-methylphenyl)cyclohexane, 1,1-bis(4-hydroxy-3-methylphenyl)-3,5,5-trimethylcyclohexane, 5,5-bis(4-hydroxy-3-methylphenyl)hexahydro-4,7-methanoindane, 3,3'-dimethylbiphenol, 2,2-bis(4-hydroxy-3,5-dimethylphenyl)propane, 1,1-bis(4-hydroxy-3,5-dimethylphenyl)cyclohexane, 1,1-bis(4-hydroxy-3,5-dimethylphenyl)-3,5,5-trimethylcyclohexane, 5,5-bis(4-hydroxy-3,5-dimethylphenyl)hexahydro-4,7-methanoindane or 3,3',5,5'-tetramethylbiphenol may, for example, be mentioned.

Further, among them, 2,2-bis(3-methyl-4-hydroxyphenyl)propane, 2,2-bis(3,5-dimethyl-4-hydroxyphenyl)propane, 1,1-bis(4-hydroxy-3-methylphenyl)cyclohexane or 1,1-bis(4-hydroxy-3-methylphenyl)-3,5,5-trimethylcyclohexane is preferred, and 2,2-bis(3-methyl-4-hydroxyphenyl)propane, 2,2-bis(3,5-dimethyl-4-hydroxyphenyl)propane or 1,1-bis(4-hydroxy-3-methylphenyl)cyclohexane is preferred.

The aromatic dihydroxy compound represented by the formula (3) may be used alone or as a mixture of two or more. In the above formula (3), preferred structures of $R^1$, $R^2$, $R^3$, $R^4$ and X and preferred bonding positions to the phenyl ring are as defined in the formula (1).
(Melt Method: Ester Exchange Method)

In the melt method, a polycarbonate resin is produced by a melt polycondensation reaction continuously conducted in the presence of an ester exchange catalyst by using an aromatic dihydroxy compound and a carbonyl compound as materials.
(Carbonyl Compound)

The carbonyl compound to be used in the present invention may be a carbonic diester compound represented by the following formula:

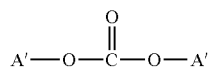

In the above formula, A' is a $C_{1-10}$ linear, branched or cyclic monovalent hydrocarbon group which may have a substituent. The two A' may be the same or different from each other. The substituent on A' may, for example, be a halogen atom, a $C_{1-10}$ alkyl group, a $C_{1-10}$ alkoxy group, a phenyl group, a phenoxy group, a vinyl group, a cyano group, an ester group, an amide group or a nitro group.

The carbonic diester compound may, for example, be specifically a substituted diphenyl carbonate such as diphenyl carbonate or ditolyl carbonate, or a dialkyl carbonate such as dimethyl carbonate, diethyl carbonate or di-t-butyl carbonate.

Among them, diphenyl carbonate (hereinafter sometimes referred to simply as DPC) or a substituted diphenyl carbonate is preferred. Such a carbonic diester may be used alone or as a mixture of two or more.

Further, the above carbonic diester compound may be replaced by a dicarboxylic acid or a dicarboxylate in an amount of preferably at most 50 mol %, more preferably at most 30 mol %.

The representative examples of the dicarboxylic acid or dicarboxylate include terephthalic acid, isophthalic acid, diphenyl terephthalate and diphenyl isophthalate. When the carbonic diester is replaced by such a dicarboxylic acid or a dicarboxylate, a polyester carbonate is obtained.

In the present invention, those carbonic diester compounds (including the above substitutional dicarboxylic acid or dicarboxylate; the same applies hereinafter), are used in excess over the aromatic dihydroxy compound.

That is, the carbonic diester compound is used in a molar ratio of usually from 1.01 to 1.30 mol, preferably from 1.02 to 1.20 mol per 1 mol of the aromatic dihydroxy compound. If the amount of use of the carbonic diester compound is excessively small, the terminal hydroxy group concentration of the obtainable polycarbonate resin tends to be high, thus deteriorating the thermal stability. Further, if the amount of use of the carbonic diester compound is excessively large, the ester exchange reaction rate tends to be decreased, and production of a polycarbonate resin having a desired molecular weight tends to be difficult, and in addition, an amount of the carbonic diester compound remaining in the resin becomes so large as to produce an unpleasant odor during the molding process or from a molded article, which is undesirable.

(Ester Exchange Catalyst)

The ester exchange catalyst used in the present invention, may be one of catalysts generally used in producing a polycarbonate resin by an ester exchange method, and is not particularly limited. In general, examples of the catalyst include basic compounds such as an alkali metal compound, an alkaline earth metal compound, a beryllium compound, a magnesium compound, a basic boron compound, a basic phosphorus compound, a basic ammonium compound, and an amine compound. Among them, an alkali metal compound or an alkaline earth metal compound is practically preferred. Those ester exchange catalysts may be used alone or as a mixture of two or more of them.

The amount of use of the ester exchange catalyst is usually within a range of from $1 \times 10^{-9}$ to $1 \times 10^{-1}$ mol per 1 mol of the entire aromatic dihydroxy compound. In order to obtain an aromatic polycarbonate excellent in the moldability and the hue, the amount of the ester exchange catalyst is, when an alkali metal compound and/or an alkaline earth metal compound is used, preferably within a range of from $1.0 \times 10^{-6}$ to $5 \times 10^{-6}$ mol, more preferably within a range of from $1.0 \times 10^{-6}$ to $4 \times 10^{-6}$ mol, particularly preferably within a range of from $1.3 \times 10$ to $3.8 \times 10^{-6}$ mol, per 1 mol of all the aromatic dihydroxy compounds. If the amount is smaller than the above lower limit, polymerization activity necessary to produce a polycarbonate having a desired molecular weight and the amount of the branching component to attain the moldability will not be obtained, and if it is larger than the above upper limit, the polymer hue may be deteriorated, or the amount of the branching component tends to be too many, thus leading to a decrease in the fluidity, whereby no desired aromatic polycarbonate having excellent moldability will be obtained.

Examples of the alkali metal compound include inorganic alkali metal compounds such as hydroxides, carbonates and hydrogen carbonate compounds of alkali metals; and organic alkali metal compounds such as salts of alkali metals with alcohols, phenols or organic carboxylic acids. Examples of the alkali metals include lithium, sodium, potassium, rubidium and cesium. Among such alkali metal compounds, a cesium compound is preferred, and cesium carbonate, cesium hydrogen carbonate and cesium hydroxide are particularly preferred.

Examples of the alkaline earth metal compound include inorganic alkaline earth metal compounds such as hydroxides or carbonates of alkaline earth metals; and salts of alkaline earth metals with alcohols, phenols or organic carboxylic acids. Examples of the alkaline earth metals include calcium, strontium and barium.

Further, examples of the beryllium compound and the magnesium compound include inorganic metal compounds such as hydroxides or carbonates of the metals; and salts of those metals with alcohols, phenols or organic carboxylic acids.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethylmethyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide.

Examples of the amine compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline.

(Production of Polycarbonate Resin by Melt Method)

Production of the polycarbonate resin by the melt method is conducted by preparing a material mixture melt containing the aromatic dihydroxy compound and the carbonic diester compound as materials (raw material preparation step) and subjecting these compounds to a multi-stage polycondensation reaction in a molten state in the presence of an ester exchange reaction catalyst using a plurality of reactors (polycondensation step). The reaction method may be any of a batchwise method, a continuous method and a combination of a batchwise method and a continuous method. As the reactors, a plurality of vertical stirring reactors and at least one horizontal stirring reactor successive thereto are preferred. Usually, these reactors are preferably connected in series to carry out the treatment continuously.

After the polycondensation step, a step of terminating the reaction and evaporating and removing unreacted materials and reaction by-products in the polycondensation reaction liquid, a step of adding a thermal stabilizer, a mold release agent, a colorant or the like, a step of forming the polycarbonate resin into pellets having a predetermined particle size, or the like may properly be added.

(Interfacial Method)

By the method for producing a polycarbonate resin by the interfacial method, usually an alkaline aqueous solution of an aromatic dihydroxy compound is prepared, and in the presence of an amine compound used as a polymerization catalyst, an interfacial polycondensation reaction of the aromatic dihydroxy compound and carbonyl chloride (hereinafter sometimes referred to as CDC) is carried out, followed by steps of neutralization, washing with water and drying to obtain a polycarbonate resin.

CDC is usually used in the form of liquid or gas. The preferred amount of use of CDC is properly selected depending upon the reaction conditions, particularly the reaction temperature and the concentration of the metal salt of the aromatic dihydroxy compound in the aqueous phase and is not particularly limited. Usually, the amount of CDC is from 1 to 2 mol, preferably from 1.05 to 1.5 mol, per 1 mol of the aromatic dihydroxy compound. If the amount of use of CDC is excessively large, unreacted CDC tends to increase, and the units may remarkably be deteriorated. Further, if the amount of use of CDC is excessively small, the chloroformate group amount tends to be insufficient, and no appropriate molecular weight elongation tends to be conducted.

In the interfacial method, usually an organic solvent is used. The organic solvent may be any inert organic solvent in which carbonyl chloride and reaction products such as a carbonate oligomer and a polycarbonate resin are dissolved, and which is not miscible with water (or which does not form a solution with water).

Such an inert organic solvent may, for example, be an aliphatic hydrocarbon such as hexane or n-heptane; a chlorinated aliphatic hydrocarbon such as dichloromethane, chloroform, carbon tetrachloride, dichloroethane, trichloroethane, tetrachloroethane, dichloropropane or 1,2-dichloroethylene; an aromatic hydrocarbon such as benzene, toluene or xylene, a chlorinated aromatic hydrocarbon such as chlorobenzene, o-dichlorobenzene or chlorotoluene; or a substituted aromatic hydrocarbon such as nitrobenzene or acetophenone.

Among them, for example, a chlorinated hydrocarbon such dichloromethane or chlorobenzene is suitably used. Such an inert organic solvent may be used alone or as a mixture with another solvent.

The condensation catalyst may optionally be selected among many condensation catalysts which have been used for a two-phase interfacial condensation method. It may, for example, be trialkylamine, N-ethylpyrrolidone, N-ethylpiperidine, N-ethylmorpholine, N-isopropylpiperidine or N-isopropylmorpholine. Among them, triethylamine or N-ethylpiperidine is preferred.

As the chain stopper, usually a monophenol is used. The monophenol may, for example, be phenol; a $C_{1-20}$ alkylphenol such as p-t-butylphenol or p-cresol; or a halogenated phenol such as p-chlorophenol or 2,4,6-tribromophenol. The amount of use of the monophenol is properly selected depending upon the molecular weight of the obtainable carbonate oligomer, and is usually from 0.5 to 10 mol % based on the aromatic dihydroxy compound.

In the interfacial method, the molecular weight of the polycarbonate resin is determined by the amount of addition of the chain stopper such as the monophenol. Accordingly, the timing of addition of the chain stopper is preferably between immediately after completion of consumption of the carbonate-forming compound and before the molecular weight elongation starts, with a view to controlling the molecular weight of the polycarbonate resin.

If the monophenol is added when the carbonate-forming compound coexists, a condensate of the monophenol (a diphenyl carbonate) forms in a large amount, and no polycarbonate resin having a desired molecular weight tends to be obtained. If the timing of addition of the monophenol is too late, there may be such drawbacks that the molecular weight control tends to be difficult, the obtainable resin may have a specific shoulder on the low molecular side in the molecular weight distribution, and sagging may occur at the time of forming.

Further, in the interfacial method, an optional branching agent may be used. Such a branching agent may, for example, be 2,4-bis(4-hydroxyphenylisopropyl)phenol, 2,6-bis(2-hydroxy-5-methylbenzyl)-4-methylphenol, 2-(4-hydroxyphenyl)-2-(2,4-dihydroxyphenyl)propane or 1,4-bis(4,4'-dihydroxytriphenylmethyl)benzene. Further, 2,4-dihydroxybenzoic acid, trimesic acid, cyanuric chloride or the like may also be used. Among them, a branching agent having at least three phenolic hydroxy groups is suitable. The amount of use of the branching agent is properly selected depending upon the degree of branching of the obtainable carbonate oligomer, and is usually from 0.05 to 2 mol % based on the aromatic dihydroxy compound.

(Production of Polycarbonate Resin by Interfacial Method)

Production of the polycarbonate resin by the interfacial method is preferably carried out by preparing an alkaline aqueous solution of an aromatic dihydroxy compound (raw material preparation step), carrying out a phosgene reaction of the aromatic dihydroxy compound in the presence of carbonyl chloride ($COCl_2$) and an organic solvent and then carrying out an oligomerization reaction of the aromatic dihydroxy compound by using a condensation catalyst and a chain stopper (oligomerization step), then carrying out a polycondensation reaction using the oligomer (polycondensation step), washing the reaction liquid after the polycondensation reaction by alkali washing, acid washing and water washing (washing step), preliminarily concentrating the washed reaction liquid, granulating the polycarbonate resin and isolating the polycarbonate resin particles (resin isolation step) and drying the isolated polycarbonate resin particles (drying step).

The polycarbonate resin of the present invention may contain, in addition to the polycarbonate resin having structural units represented by the above formula (1), as the case requires, a polycarbonate resin having structural units represented by the following formula (4):

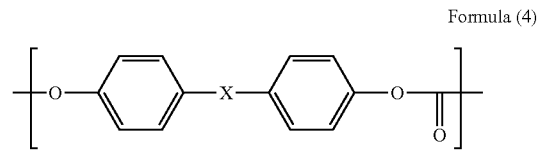

Formula (4)

wherein X is as defined in the above formula (1).

The polycarbonate resin having structural units represented by the formula (4) may, for example, be specifically a homopolymer of 2,2-bis(4-hydroxyphenyl)propane (bisphenol A) or a copolymer of one or more of the aromatic dihydroxy compounds represented by the above formula (2) and bisphenol A.

In the present invention, in a case where the polycarbonate resin having structural units represented by the above formula (1) and the polycarbonate resin having structural units represented by the formula (4) are used in combination, the content of the polycarbonate resin having structural units represented by the formula (4) is preferably at most 99 wt %, more preferably at least 50 wt % in the entire polycarbonate resin.

(Flame Retardant)

The flame retardant used in the present invention may, for example, be at least one member selected from the group consisting of a metal sulfonate type flame retardant, a halogen-containing compound type flame retardant, a phosphorus-containing compound type flame retardant and a silicon-containing compound type flame retardant. Among them, a metal sulfonate type flame retardant is preferred.

The blending amount of the flame retardant used in the present invention is usually at least 0.01 part by weight, preferably at least 0.05 part by weight per 100 parts by weight of the polycarbonate resin. If the blending amount of the flame retardant is excessively small, the flame retardant effect will be decreased. If the blending amount of the flame retardant is excessively large, the mechanical strength of the molded article of resin tends to be decreased too much.

The metal sulfonate type flame retardant may, for example, be a metal aliphatic sulfonate or a metal aromatic sulfonate. The metal of such a metal salt may, for example, be an alkali metal such as sodium, lithium, potassium, rubidium or cesium; beryllium or a magnesium such as magnesium; or an alkaline earth metal such as calcium, strontium or barium. The metal sulfonate may be used alone or as a mixture of two or more. The metal sulfonate may, for example, be a metal aromatic sulfone sulfonate or a metal perfluoroalkane sulfonate.

The metal sulfonate type flame retardant is added in an amount of preferably from 0.04 to 0.3 part by weight, more preferably from 0.05 to 0.2 part by weight, per 100 parts by weight of the polycarbonate resin.

The metal aromatic sulfone sulfonate may, for example, be specifically sodium diphenylsulfone-3-sulfonate, potassium diphenylsulfone-3-sulfonate, sodium 4,4'-dibromodiphenyl-sulfone-3-sulfonate, potassium 4,4'-dibromodiphenyl-sulfone-3-sulfone, calcium 4-chloro-4'-nitrodiphenylsulfone-3-sulfonate, disodium diphenylsulfone-3,3'-disulfonate or dipotassium diphenylsulfone-3,3'-disulfonate.

The metal perfluoroalkane sulfonate may, for example, be sodium perfluorobutane sulfonate, potassium perfluorobutane sulfonate, sodium perfluoromethylbutane sulfonate, potassium perfluoromethylbutane sulfonate, sodium perfluorooctane sulfonate, potassium perfluorooctane sulfonate or a tetraethylammonium salt of perfluorobutane sulfonate.

The halogen-containing compound type flame retardant may, for example, be specifically tetrabromobisphenol A, tribromophenol, brominated aromatic triazine, a tetrabromobisphenol A epoxy oligomer, a tetrabromobisphenol A epoxy polymer, decabromodiphenyl oxide, tribromoallyl ether, a tetrabromobisphenol A carbonate oligomer, ethylenebistetrabromophthalimide, decabromodiphenylethane, brominated polystyrene or hexabromocyclododecane.

The halogen-containing compound type flame retardant is added in an amount of preferably from 5 to 30 parts by weight, more preferably from 10 to 25 parts by weight, based on 100 parts by weight of the polycarbonate resin.

The phosphorus-containing compound type flame retardant may, for example, be red phosphorus, covered red phosphorus, a polyphosphate compound, a phosphate compound or a phosphazene compound. Among them, the phosphate compound may, for example, be specifically trimethyl phosphate, triethyl phosphate, tributyl phosphate, trioctyl phosphate, tributoxyethyl phosphate, triphenyl phosphate, tricresyl phosphate, cresyldiphenyl phosphate, octyldiphenyl phosphate, diisopropylphenyl phosphate, tris(chloroethyl) phosphate, tris(dichloropropyl)phosphate, tris(chloropropyl) phosphate, bis(2,3-dibromopropyl)-2,3-dichloropropyl phosphate, tris(2,3-dibromopropyl)phosphate, bis(chloropropyl)monooctyl phosphate, bisphenol A bisphosphate, hydroquinone bisphosphate, resorcin bisphosphate or trioxybenzene triphosphate.

The phosphorus-containing compound type flame retardant is added in an amount of preferably from 3 to 15 parts by weight, more preferably from 5 to 25 parts by weight, most preferably from 10 to 12 parts by weight, per 100 parts by weight of the polycarbonate resin.

The silicon-containing compound type flame retardant may, for example, be silicone varnish, a silicone resin wherein substituents bonded to silicon atoms are an aromatic hydrocarbon group and an aliphatic hydrocarbon group having at least 2 carbon atoms, a silicone compound having a branched main chain and having an aromatic group in the organic functional group contained, a silicone powder having a polydiorganosiloxane polymer which may have functional groups supported on the surface of a silica powder, or an organopolysiloxane-polycarbonate copolymer.

The molded article molded from the polycarbonate resin to which this embodiment is applicable, which comprises a combination of the polycarbonate resin having structural units represented by the above formula (1) and the flame retardant, has flame retardancy improved as compared with a molded article molded from a resin composition using a polycarbonate resin obtainable by using bisphenol A as a material monomer (hereinafter referred to as "A-PC").

The reason why the flame retardancy of the molded article molded from the polycarbonate resin to which this embodiment is applicable is improved is not clearly understood, but is considered to be as follows, with reference to a case of using a polycarbonate resin obtained by using 2,2-bis(3-methyl-4-hydroxyphenyl)propane which is an aromatic dihydroxy compound as the material monomer (hereinafter referred to as "C-PC"), or a polycarbonate resin obtained by using 2,2-bis(3,5-dimethyl-4-hydroxyphenyl) propane as the material monomer (hereinafter referred to as "Tm-PC") as the polycarbonate resin component, as an example.

That is, C-PC and Tm-PC (hereinafter referred to as "C-PC and the like" are quickly decomposed since the molecular chain is likely to be cleaved by having a methyl group on the benzene ring forming the structure, as compound with a polycarbonate resin obtained by using 2,2-bis(4-hydroxypheneyl) propane (bisphenol A) as the material monomer (hereinafter referred to as "A-PC"). Thus, C-PC and the like are quickly decomposed and graphitized, thus forming a heat insulating layer (char), whereby flame retardancy is easily attained. The low thermal decomposition starting temperature of C-PC and the like as compared with A-PC is influenced by the difference in the structure of the bisphenol structure that "the 3-position of each of the two benzene rings is substituted by a methyl group". Particularly in a case where C-PC is produced by the above-described melt method, when the polymerization reaction proceeds in a molten state at high temperature and at high shear strength, a branch is likely to form from the 3-position of each of the phenyl rings of the bisphenol compound. Accordingly, it is considered that the flame retardancy is improved such that in a flammability test, flaming drips are suppressed.

Further, C-PC and the like have a lowered packing density of molecular chains as compared with A-PC and has molecular chains which are rigid and hardly move, and thus the molded article of resin tends to have a low shrinkage and a low linear expansion coefficient. Thus, high dimensional stability of the molded article of resin is expected.

The molded article molded from the polycarbonate resin of the present invention, which has such properties, is suitable as a material for resin members for which high dimensional accuracy is required, such as chassis for precision instruments such as cellular phones and PCs; housing for home electric appliances such as TVs; screen films; exterior members of a multicolor molded resin molded article of two or more colors, such as glazing; and multilayered extruded products having at least two surface layers of building materials such as carports, agricultural greenhouses and acoustic insulation boards.

Further, from the polycarbonate resin of the present invention, it is possible to prepare a molded article of resin having high hardness and improved flame retardancy, and the molded article is suitable for applications of e.g. molded articles of resin related to illumination such as LED, such as lamp lenses, protective covers and diffusers; lenses for glasses, vending machine buttons, and keys of e.g. mobile devices.

<Additives>

To the polycarbonate resin composition of the present invention, various additives are blended as the case requires. The additives may, for example, be a stabilizer, an ultraviolet absorber, a mold release agent, a colorant, an antistatic agent, a thermoplastic resin, a thermoplastic elastomer, glass fibers, glass flakes, glass beads, carbon fibers, Wollastonite, calcium silicate and aluminum borate whiskers.

The method of mixing the polycarbonate resin and the flame retardant and the additives or the like blended as the case requires is not particularly limited. In the present invention, for example, a method of mixing the polycarbonate resin in a solid state such as pellets or a powder with the flame retardant and the like, followed by kneading e.g. by an extruder, a method of mixing the polycarbonate resin in a molten state and the flame retardant and the like, and a method of adding the flame retardant and the like during the polymerization reaction of the material monomer by the melt method or the interfacial method, or when the polymerization reaction is completed.

<Molded Article of Polycarbonate Resin>

By using the polycarbonate resin composition of the present invention, a molded article of polycarbonate resin is prepared. The method of molding the molded article of polycarbonate resin is not particularly limited, and for example, a molding method using a conventional molding machine such as an injection molding machine may be mentioned.

The molded article of polycarbonate resin of the present invention has a decrease in the surface hardness and the transparency suppressed and has favorable flame retardancy, as compared with a case of using, for example, a polycarbonate resin obtainable by using e.g. bisphenol A having no substituent on the phenyl group as a monomer.

Specifically, the molded article molded from the polycarbonate resin composition of the present invention, with respect to the flame retardancy, preferably satisfies the classification V-0 in a flammability test of UL94 with respect to a test specimen having a thickness of at most 2 mm. With respect to the transparency, the haze is preferably at most 1.0 with respect to a test specimen having a thickness of 3 mm in accordance with JIS K7136.

<Pencil Hardness>

The polycarbonate resin and the polycarbonate resin composition of the present invention preferably have a pencil hardness in accordance with ISO 15184 of at least HB. The pencil hardness is more preferably at least F, further preferably at least H. Further, it is usually at most 3H. If the pencil hardness is less than HB, the surface of the molded article of resin tends to be scarred.

The pencil hardnesses of the polycarbonate resin and the polycarbonate resin composition in the present invention are values of the surface hardnesses of molded articles molded from the polycarbonate resin and the polycarbonate resin composition measured by a pencil hardness tester in accordance with ISO 15184.

EXAMPLES

Now, the present invention will be described in further detail with reference to Examples. However, it should be understood that the present invention is by no means restricted to the following Examples, within the scope of the present invention.

The polycarbonate resin, the flame retardant and the mold release agent used in the present invention are shown below.

A. Polycarbonate Resin (PC-1-1):

(Preparation of Polycarbonate Resin (PC-1-1) by Melt Method)

6.55 mol (1.68 kg) of 2,2-bis(3-methyl-4-hydroxyphenyl) propane (hereinafter referred to as "BPC") and 6.73 mol (1.44 kg) of diphenyl carbonate were put in a SUS reactor (internal volume: 10 liter) equipped with a stirring machine and a condenser, the interior of the reactor was replaced with nitrogen gas, and the temperature was raised to 220° C. over a period of 30 minutes in a nitrogen gas atmosphere.

Then, the reaction liquid in the reactor was stirred, and to the reaction liquid in a molten state, cesium carbonate ($Cs_2CO_3$) as an ester exchange reaction catalyst was added in an amount of $1.5 \times 10^{-6}$ mol (3.20 mg as $Cs_2CO_3$) per 1 mol of BPC, and the reaction liquid was stirred and fermented in a nitrogen gas atmosphere at 220° C. for 30 minutes. Then, the pressure in the reactor was reduced to 100 Torr over a period of 40 minutes at the same temperature, followed by reaction further for 100 minutes to distil phenol off.

Then, the temperature in the reactor was raised to 280° C. over a period of 60 minutes and the pressure in the reactor was reduced to 3 Torr to distil phenol off in an amount corresponding to substantially the entire amount of the theoretical distillation amount. Then, while the pressure in the reactor was maintained to be less than 1 Torr, the reaction was continued further for 60 minutes to complete the polycondensation reaction. On that occasion, the number of revaluations of stirring of the stirring machine was 16 revolutions per minute, the reaction liquid temperature immediately before completion of the reaction was 286° C., and the stirring power was 1.15 kW.

Then, the reaction liquid was transferred to a twin screw extruder, butyl p-toluene sulfonate in an amount of 4 times by mole of cesium carbonate was supplied from a first supply port of the twin screw extruder and kneaded with the reaction liquid, and then the reaction liquid was extruded through a die of the twin screw extruder into strands, which were cut by a cutter to obtain pellets of a polycarbonate resin.

Physical properties of the obtained polycarbonate resin (PC-1-1) are shown below.

| | |
|---|---|
| Intrinsic viscosity [η] (dl/g) | 0.552 |
| Branch parameter G ([η]/[η]lin) | 0.87 |
| $ln\eta_{10}/[\eta]$ | 12.6 |
| $ln\eta_{1000}/[\eta]$ | 9.8 |
| Pencil hardness | 2H |
| $\eta_{10}/\eta_{1000}$ | 4.6 |
| Weight average molecular weight (Mw) | 66,500 |
| (Mw/Mn) | 3.14 |

(PC-1-2):

(Preparation of Polycarbonate Resin (PC-1-2) by Melt Method)

6.59 mol (1.69 kg) of 2,2-bis(3-methyl-4-hydroxyphenyl) propane (hereinafter referred to as "BPC") and 6.73 mol (1.44 kg) of diphenyl carbonate were put in a SUS reactor (internal volume: 10 liter) equipped with a stirring machine and a condenser, the interior of the reactor was replaced with nitrogen gas, and the temperature was raised to 220° C. over a period of 30 minutes in a nitrogen gas atmosphere.

Then, the reaction liquid in the reactor was stirred, and to the reaction liquid in a molten state, cesium carbonate ($Cs_2CO_3$) as an ester exchange reaction catalyst was added in an amount of $1.5 \times 10^{-6}$ mol (3.20 mg as $Cs_2CO_3$) per 1 mol of BPC, and the reaction liquid was stirred and fermented in a nitrogen gas atmosphere at 220° C. for 30 minutes. Then, the pressure in the reactor was reduced to 100 Torr over a period of 40 minutes at the same temperature, followed by reaction further for 100 minutes to distil phenol off.

Then, the temperature in the reactor was raised to 284° C. over a period of 60 minutes and the pressure in the reactor was reduced to 3 Torr to distil phenol off in an amount corresponding to substantially the entire amount of the theoretical distillation amount. Then, while the pressure in the reactor was maintained to be less than 1 Torr, the reaction was continued further for 60 minutes to complete the polycondensation reaction. On that occasion, the number of revaluations of stirring of the stirring machine was 16 revolutions per minute, the reaction liquid temperature immediately before completion of the reaction was 289° C., and the stirring power was 1.15 kW.

Then, the reaction liquid was transferred to a twin screw extruder, butyl p-toluene sulfonate in an amount of 4 times by mole of cesium carbonate was supplied from a first supply port of the twin screw extruder and kneaded with the reaction liquid, and then the reaction liquid was extruded through a die of the twin screw extruder into strands, which were cut by a cutter to obtain pellets of a polycarbonate resin.

Physical properties of the obtained polycarbonate resin (PC-1-2) are shown below.

| Intrinsic viscosity [η] (dl/g) | 0.597 |
|---|---|
| Branch parameter G ([η]/[η]Iin) | 0.85 |
| $\ln\eta_{10}/[\eta]$ | 12.1 |
| $\ln\eta_{1000}/[\eta]$ | 9.5 |
| Pencil hardness | 2H |
| $\eta_{10}/\eta_{1000}$ | 4.9 |
| Weight average molecular weight (Mw) | 70,200 |
| (Mw/Mn) | 3.48 |

(PC-1-3):

(Preparation of Polycarbonate Resin (PC-1-3) by Melt Method)

It was prepared under the same conditions for the polycarbonate resin (PC-1-2) except that the amount of BPC was 6.59 mol (1.69 kg), and the reaction time after the pressure in the reactor was maintained to be less than 1 Torr was 80 minutes. The reaction liquid temperature immediately before completion of the reaction was 300° C., and the stirring power was 1.15 kW.

Physical properties of the obtained polycarbonate resin (PC-1-3) are shown below.

| Intrinsic viscosity [η] (dl/g) | 0.708 |
|---|---|
| Branch parameter G ([η]/[η]Iin) | 0.83 |
| $\ln\eta_{10}/[\eta]$ | 11.6 |
| $\ln\eta_{1000}/[\eta]$ | 8.6 |
| Pencil hardness | 2H |
| $\eta_{10}/\eta_{1000}$ | 7.9 |
| Weight average molecular weight (Mw) | 99,500 |
| (Mw/Mn) | 3.94 |

(PC-1-5):

(Preparation of Polycarbonate Resin (PC-1-5) by Melt Method)

A polycarbonate resin was produced under the same conditions as in the preparation of the polycarbonate resin (PC-1-1) except that 100% of BPC was used, 0.34 kg of BPA and 1.34 kg of 2,2-bis(3,5-dimethyl-4-hydroxyphenyl)propane (hereinafter referred to as Tm-BPA) were used in combination, the amount of $Cs_2CO_3$ was changed to $5.0 \times 10^{-6}$ mol per 1 mol of the total amount of BPA and Tm-BPA, and THPE was added in an amount of $3.5 \times 10^{-3}$ mol per 1 mol of the total amount of BPA and Tm-BPA. As a result of $^1$H-NMR measurement of the polycarbonate resin, in the polycarbonate resin, the amount of the structural units derived from BPA was 20.4 mass %, and the amount of the structural units derived from Tm-BPA was 79.6 mass %. Physical properties of the obtained polycarbonate resin (PC-1-5) are shown below.

| Intrinsic viscosity [η] (dl/g) | 0.512 |
|---|---|
| Branch parameter G ([η]/[η]Iin) | 0.90 |
| $\ln\eta_{10}/[\eta]$ | 13.3 |
| $\ln\eta_{1000}/[\eta]$ | 10.1 |
| Pencil hardness | H |
| $\eta_{10}/\eta_{1000}$ | 3.2 |
| Weight average molecular weight (Mw) | 61,300 |
| (Mw/Mn) | 3.21 |

(PC-1-6): Polycarbonate Resin NOVAREX M7022J Manufactured by Mitsubishi Engineering-Plastics Corporation

| Pencil hardness | 3B |
|---|---|
| $\eta_{10}/\eta_{1000}$ | 2.8 |

(PC-1-9): NOVAREX M7027J Manufactured by Mitsubishi Engineering-Plastics Corporation

| Pencil hardness | 3B |
|---|---|
| $\eta_{10}/\eta_{1000}$ | 5.2 |

(PC-1-10): Iupilon S-3000 Manufactured by Mitsubishi Engineering-Plastics Corporation

| Intrinsic viscosity [η] (dl/g) | 0.475 |
|---|---|
| Branch parameter G ([η]/[η]Iin) | 1.0 |
| $\ln\eta_{10}/[\eta]$ | 14.3 |
| $\ln\eta_{1000}/[\eta]$ | 12.4 |
| Pencil hardness | 2B |
| $\eta_{10}/\eta_{1000}$ | 2.3 |
| Weight average molecular weight (Mw) | 45,000 |
| (Mw/Mn) | 2.90 |

(PC-1-11):

(Preparation of Polycarbonate Resin (PC-1-11) by Interfacial Method)

BPC in a rate of 13.80 kg/hour, sodium hydroxide (NaOH) in a rate of 5.8 kg/hour and water in a rate of 93.5 kg/hour were dissolved at 35° C. in the presence of hydrosulfite in a rate of 0.017 kg/hour, and an aqueous phase cooled to 25° C. and an organic phase of methylene chloride cooled to 5° C. in a rate of 61.9 kg/hour were respectively supplied to Teflon (registered trademark) pipes each having an inner diameter of 6 mm and an outer diameter of 8 mm, and in a Teflon (registered trademark) pipe reactor having an inner diameter of 6 mm and a length of 34 m connected thereto, they were brought into contact with liquid phosgene cooled to 0° C. in a rate of 7.2 kg/hour separately introduced thereto.

The above materials underwent phosgene reaction and oligomerization reaction while they passed with phosgene through the pipe reactor in a linear rate of 1.7 m/sec for 20 seconds. On that occasion, the reaction temperature reached an overhead temperature of 60° C. in the insulation system. The temperature of the reaction product was controlled to 35° C. by external cooling before it entered the subsequent oligomerization tank.

For oligomerization, triethylamine in a rate of 5 g/hour ($0.9 \times 10^{-3}$ mol per 1 mol of BPC) as a catalyst and p-t-butyl phenol in a rate of 0.12 kg/hour as a molecular weight adjusting agent were introduced into an oligomerization tank.

The oligomerized emulsion obtained by the pipe reactor in such a manner was further introduced into a reaction tank having an internal volume of 50 liter equipped with a stirring machine, stirred in a nitrogen gas ($N_2$) atmosphere at 30° C. and oligomerized to consume a sodium salt of unreacted BPC (BPC-Na) present in the aqueous phase, and then the reaction liquid was left at rest to separate an aqueous phase and an oil phase thereby to obtain a methylene chloride solution of the oligomer.

23 kg of the above methylene chloride solution of the oligomer was charged into a reaction tank having an internal volume of 70 liter equipped with a Pfaudler blade, 10 kg of methylene chloride for dilution was added, and 2.2 kg of a 25 wt % sodium hydroxide aqueous solution, 6 kg of water and 2.2 g ($1.1 \times 10^{-3}$ mol per 1 mol of BPC) of triethylamine were added and stirred in a nitrogen gas atmosphere at 30° C. to conduct a polycondensation reaction for 60 minutes thereby to obtain a polycarbonate resin.

Then, 30 kg of methylene chloride and 7 kg of water were added, followed by stirring for 20 minutes, and then stirring was stopped, and an aqueous phase and an organic phase were separated. To the separated organic phase, 20 kg of 0.1N hydrochloric acid was added, followed by stirring for 15 minutes to extract triethylamine and an alkali component remaining in a small amount, and then stirring was stopped, and an aqueous phase and an organic phase were separated.

Further, to the separated organic phase, 20 kg of pure water was added, followed by stirring for 15 minutes, then stirring was stopped, and an aqueous phase and an organic phase were separated. This operation was repeatedly carried out (three times) until no chlorine ions in the extract waste liquid were detected. The obtained purified organic phase was fed into warm water at 40° C. to powder it, and dried to obtain a granular powder (flakes) of the polycarbonate resin.

The flakes of the polycarbonate resin obtained were transferred to a twin screw extruder, extruded through a die of the twin screw extruder into strands, which were cut by a cutter to obtain pellets of the polycarbonate resin. Physical properties of the obtained polycarbonate resin (PC-1-11) are shown below.

| | |
|---|---|
| Intrinsic viscosity [$\eta$] (dl/g) | 0.978 |
| Branch parameter G ([$\eta$]/[$\eta$]Iin) | 1.00 |
| In$\eta_{10}$/[$\eta$] | 9.4 |
| In$\eta_{1000}$/[$\eta$] | 7.2 |
| Pencil hardness | 2H |
| $\eta_{10}/\eta_{1000}$ | 8.8 |
| Weight average molecular weight (Mw) | 119,700 |
| (Mw/Mn) | 3.54 |

(PC-2-1):

(Preparation of Polycarbonate Resin (PC-2-1) by Melt Method)

6.59 mol (1.69 kg) of 2,2-bis(3-methyl-4-hydroxyphenyl)propane (hereinafter referred to as "BPC") and 6.73 mol (1.44 kg) of diphenyl carbonate were put in a SUS reactor (internal volume: 10 liter) equipped with a stirring machine and a condenser, the interior of the reactor was replaced with nitrogen gas, and the temperature was raised to 220° C. over a period of 30 minutes in a nitrogen gas atmosphere.

Then, the reaction liquid in the reactor was stirred, and to the reaction liquid in a molten state, cesium carbonate ($Cs_2CO_3$) as an ester exchange reaction catalyst was added in an amount of $1.5 \times 10^{-6}$ mol (3.20 mg as $Cs_2CO_3$) per 1 mol of BPC, and the reaction liquid was stirred and fermented in a nitrogen gas atmosphere at 220° C. for 30 minutes. Then, the pressure in the reactor was reduced to 100 Torr over a period of 40 minutes at the same temperature, followed by reaction further for 100 minutes to distil phenol off.

Then, the temperature in the reactor was raised to 284° C. over a period of 60 minutes and the pressure in the reactor was reduced to 3 Torr to distil phenol off in an amount corresponding to substantially the entire amount of the theoretical distillation amount. Then, while the pressure in the reactor was maintained to be less than 1 Torr, the reaction was continued further for 80 minutes to complete the polycondensation reaction. The reaction liquid temperature immediately before completion of the reaction was 300° C., and the stirring power was 1.15 kW. Then, the reaction liquid was transferred to a twin screw extruder, butyl p-toluene sulfonate in an amount of 4 times by mole of cesium carbonate was supplied from a first supply port of the twin screw extruder and kneaded with the reaction liquid, and then the reaction liquid was extruded through a die of the twin screw extruder into strands, which were cut by a cutter to obtain pellets of a polycarbonate resin.

Physical properties of the obtained polycarbonate resin (PC-2-1) are shown below.

| | |
|---|---|
| Intrinsic viscosity [$\eta$] (dl/g) | 0.708 |
| Branch parameter G ([$\eta$]/[$\eta$]Iin) | 0.83 |
| In$\eta_{10}$/[$\eta$] | 11.6 |
| In$\eta_{1000}$/[$\eta$] | 8.6 |
| $\eta_{10}/\eta_{1000}$ | 7.9 |
| Pencil hardness | 2H |
| Weight average molecular weight (Mw) | 99,500 |
| (Mw/Mn) | 3.94 |

(PC-2-2):

(Preparation of Polycarbonate Resin (PC-2-2) by Interfacial Method) BPC in a rate of 13.80 kg/hour, sodium hydroxide (NaOH) in a rate of 5.8 kg/hour and water in a rate of 93.5 kg/hour were dissolved at 35° C. in the presence of hydrosulfite in a rate of 0.017 kg/hour, and an aqueous phase cooled to 25° C. and an organic phase of methylene chloride cooled to 5° C. in a rate of 61.9 kg/hour were respectively supplied to Teflon (registered trademark) pipes each having an inner diameter of 6 mm and an outer diameter of 8 mm, and in a Teflon (registered trademark) pipe reactor having an inner diameter of 6 mm and a length of 34 m connected thereto, they were brought into contact with liquid phosgene cooled to 0° C. in a rate of 7.2 kg/hour separately introduced thereto.

The above materials underwent phosgene reaction and oligomerization reaction while they passed with phosgene through the pipe reactor in a linear rate of 1.7 m/sec for 20 seconds. On that occasion, the reaction temperature reached an overhead temperature of 60° C. in the insulation system. The temperature of the reaction product was controlled to 35° C. by external cooling before it entered the subsequent oligomerization tank.

For oligomerization, triethylamine in a rate of 5 g/hour ($0.9 \times 10^{-3}$ mol per 1 mol of BPC) as a catalyst and p-t-butyl phenol in a rate of 0.153 kg/hour as a molecular weight adjusting agent were introduced into an oligomerization tank.

The oligomerized emulsion obtained by the pipe reactor in such a manner was further introduced into a reaction tank having an internal volume of 50 liter equipped with a stirring machine, stirred in a nitrogen gas ($N_2$) atmosphere at 30° C. and oligomerized to consume a sodium salt of unreacted BPC (BPC-Na) present in the aqueous phase, and then the reaction liquid was left at rest to separate an aqueous phase and an oil phase thereby to obtain a methylene chloride solution of the oligomer.

23 kg of the above methylene chloride solution of the oligomer was charged into a reaction tank having an internal volume of 70 liter equipped with a Pfaudler blade, 10 kg of methylene chloride for dilution was added, and 2.2 kg of a 25 wt % sodium hydroxide aqueous solution, 6 kg of water and 2.2 g ($1.1 \times 10^{-3}$ mol per 1 mol of BPC) of triethylamine were added and stirred in a nitrogen gas atmosphere at 30° C. to conduct a polycondensation reaction for 60 minutes thereby to obtain a polycarbonate resin.

Then, 30 kg of methylene chloride and 7 kg of water were added, followed by stirring for 20 minutes, and then stirring was stopped, and an aqueous phase and an organic phase were separated. To the separated organic phase, 20 kg of 0.1N hydrochloric acid was added, followed by stirring for 15 minutes to extract triethylamine and an alkali component remaining in a small amount, and then stirring was stopped, and an aqueous phase and an organic phase were separated.

Further, to the separated organic phase, 20 kg of pure water was added, followed by stirring for 15 minutes, then stirring was stopped, and an aqueous phase and an organic phase were separated. This operation was repeatedly carried out (three times) until no chlorine ions in the extract waste liquid were detected. The obtained purified organic phase was fed into warm water at 40° C. to powder it, and dried to obtain a granular powder of the polycarbonate resin.

The flakes of the polycarbonate resin obtained were transferred to a twin screw extruder, extruded through a die of the twin screw extruder into strands, which were cut by a cutter to obtain pellets of the polycarbonate resin. Physical properties of the obtained polycarbonate resin (PC-2-2) are shown below.

| | |
|---|---|
| Intrinsic viscosity [η] (dl/g) | 0.661 |
| Branch parameter G ([η]/[η]lin) | 1.00 |
| $\ln\eta_{10}/[\eta]$ | 11.3 |
| $\ln\eta_{1000}/[\eta]$ | 9.1 |
| $\eta_{10}/\eta_{1000}$ | 3.8 |
| Pencil hardness | 2H |
| Weight average molecular weight (Mw) | 89,800 |
| (Mw/Mn) | 3.55 |

(PC-2-3): NOVAREX M7027BF Manufactured by Mitsubishi Engineering-Plastics Corporation

| | |
|---|---|
| Intrinsic viscosity [η] (dl/g) | 0.559 |
| Branch parameter G ([η]/[η]lin) | 0.88 |
| $\ln\eta_{10}/[\eta]$ | 14.5 |
| $\ln\eta_{1000}/[\eta]$ | 11.4 |
| $\eta_{10}/\eta_{1000}$ | 5.7 |
| Pencil hardness | 2B |
| (Mw/Mn) | 2.70 |

(PC-2-4): Iupilon E-2000 Manufactured by Mitsubishi Engineering-Plastics Corporation

| | |
|---|---|
| Intrinsic viscosity [η] (dl/g) | 0.586 |
| Branch parameter G ([η]/[η]lin) | 1.00 |
| $\ln\eta_{10}/[\eta]$ | 15.1 |
| $\ln\eta_{1000}/[\eta]$ | 11.2 |
| $\eta_{10}/\eta_{1000}$ | 9.8 |
| Pencil hardness | 2B |
| (Mw/Mn) | 3.10 |

(PC-2-5):

(Preparation of Polycarbonate Resin (PC-2-5))

A polycarbonate resin (PC-2-5) was obtained in the same manner as in the preparation of the polycarbonate resin (PC-2-1) except that 0.83 kg of BPA and 0.83 kg of 1,1-bis(4-hydroxy-3-methylphenyl)cyclohexane (hereinafter referred to as "Bis-OCZ") were used instead of BPC, and the amount of $Cs_2CO_3$ was changed to $5.0 \times 10^{-6}$ mol per 1 mol of the entire bisphenols. As a result of [1] H-NMR measurement of the obtained polycarbonate resin (PC-2-5), the amount of the structural units derived from BPA was 50.2 mass %, and the amount of the structural units derived from Bis-OCZ was 49.8 mass %. Physical properties of the obtained polycarbonate resin (PC-2-5) are shown below.

| | |
|---|---|
| Intrinsic viscosity [η] (dl/g) | 0.468 |
| Branch parameter G ([η]/[η]lin) | 0.88 |
| $\ln\eta_{10}/[\eta]$ | 15.6 |
| $\ln\eta_{1000}/[\eta]$ | 13.0 |
| $\eta_{10}/\eta_{1000}$ | 3.4 |
| Pencil hardness | 2H |
| Weight average molecular weight (Mw) | 50,300 |
| (Mw/Mn) | 2.75 |

(PC-2-6):

(Preparation of Polycarbonate Resin (PC-2-6))

A polycarbonate resin (PC-2-6) was produced under the same conditions as in the preparation of the polycarbonate resin (PC-2-1) except that 0.34 kg of BPA and 1.34 kg of 2,2-bis(3,5-dimethyl-4-hydroxyphenyl)propane (hereinafter referred to as Tm-BPA) were used in combination instead of use of 100% of BPC, the amount of $Cs_2CO_3$ was changed to $5.0 \times 10^{-6}$ mol per 1 mol of the total amount of BPA and Tm-BPA, and THPE was added in an amount of $3.5 \times 10^{-3}$ mol per 1 mol of the total amount of BPA and Tm-BPA. As a result of [1] H-NMR measurement of the polycarbonate resin (PC-2-6), in the resin, the amount of the BPA carbonate moiety was 20.4 mass %, and the Tm-BPA carbonate moiety was 79.6 mass %.

Physical properties of the obtained polycarbonate resin (PC-2-6) are shown below.

| | |
|---|---|
| Intrinsic viscosity [η] (dl/g) | 0.512 |
| Branch parameter G ([η]/[η]lin) | 0.90 |
| $\ln\eta_{10}/[\eta]$ | 13.3 |
| $\eta_{10}/\eta_{1000}$ | 5.1 |
| $\ln\eta_{1000}/[\eta]$ | 10.1 |
| Pencil hardness | H |
| Weight average molecular weight (Mw) | 61,300 |
| (Mw/Mn) | 3.21 |

(PC-2-7): Iupilon S-3000 Manufactured by Mitsubishi Engineering-Plastics Corporation

| | |
|---|---|
| Intrinsic viscosity [η] (dl/g) | 0.475 |
| Branch parameter G ([η]/[η]lin) | 1.0 |
| $\ln\eta_{10}/[\eta]$ | 14.3 |
| $\ln\eta_{1000}/[\eta]$ | 12.4 |
| $\eta_{10}/\eta_{1000}$ | 2.5 |
| Pencil hardness | 2B |
| Weight average molecular weight (Mw) | 45,000 |
| (Mw/Mn) | 2.90 |

(PC-2-8):

(Preparation of Polycarbonate Resin (PC-2-8))

360 parts by weight of BPC (manufactured by HONSHU CHEMICAL INDUSTRY CO., LTD.), 585.1 parts by weight of a 25 wt % sodium hydroxide (NaOH) aqueous solution and 1,721.5 parts by weight of water, in the presence of 0.41 part by weight of hydrosulfite, were dissolved at 40° C. and then cooled to 20° C. to obtain a BPC aqueous solution. This BPC aqueous solution in a rate of 8.87 kg/hour and methylene chloride in a rate of 4.50 kg/hour were introduced into a 1.8 L glass first reactor equipped with a reflux condenser, a stirring machine and a coolant jacket, and were brought into contact with phosgene at room temperature separately supplied thereto in a rate of 0.672 kg/hour. The reaction temperature at this time reached 35° C. Then, the reaction liquid/reaction gas mixture was introduced into a subsequent second reactor (1.8 L) having the same shape as the first reactor by means of an overflow tube attached to the reactor and reacted. Into the second reactor, separately, p-t-butylphenol (8 wt % methylene chloride solution) as a molecular weight adjusting agent was introduced in a rate of 0.097 kg/hour. Then, the reaction liquid/reaction gas mixture was introduced into an oligomerization tank (4.5 L) having the same shape as the first reactor through an overflow tube attached to the second reactor. Into the oligomerization tank, separately, a 2 wt % trimethylamine aqueous solution as a catalyst was introduced in a rate of 0.020 kg/hour. Then, the oligomerized emulsion thus obtained was further introduced into a separation tank (settler) having an internal volume of 5.4 L to separate an aqueous phase and an oil phase, thereby to obtain a methylene chloride solution of the oligomer.

2.258 kg of the above methylene chloride solution of the oligomer was charged into a reaction tank having an internal volume of 6.8 L equipped with a paddle blade, and 2.780 kg of methylene chloride for dilution was added, and further 0.280 kg of a 25 wt % sodium hydroxide aqueous solution, 0.925 kg of water, 8.37 g of a 2 wt % triethylamine aqueous solution, 1.94 g of p-t-butylphenol (8 wt % methylene chloride solution), and 2.3 g of 1,1,1-tris(4-hydroxyphenyl)ethane (hereinafter referred to as THPE) were added, followed by stirring at 10° C. to carry out a polycondensation reaction for 300 minutes.

3.12 kg of the polycondensation reaction liquid was charged into a reaction tank having an internal volume of 5.4 L equipped with a paddle blade, and 2.54 kg of methylene chloride and 0.575 kg of water were added, followed by stirring for 15 minutes, and then stirring was stopped, and an aqueous phase and an organic phase were separated. To the separated organic phase, 1.16 kg of 0.1 N hydrochloric acid was added, followed by stirring for 15 minutes, to extract triethylamine and an alkali component remaining in a small amount, and then stirring was stopped, and an aqueous phase and an organic phase were separated. Further, to the separated organic phase, 1.16 kg of pure water was added, followed by stirring for 15 minutes, and then stirring was stopped, and an aqueous phase and an organic phase were separated. This operation was repeated three times. The obtained purified organic phase was fed into warm water of from 60 to 75° C. to powder the polycarbonate resin, followed by drying to obtain a powdery polycarbonate resin. Physical properties of the obtained polycarbonate resin (PC-2-8) are shown below.

| | |
|---|---|
| Intrinsic viscosity [η] (dl/g) | 0.726 |
| Branch parameter G ([η]/[η]lin) | 0.87 |
| ln$\eta_{10}$/[η] | 11.3 |
| ln$\eta_{1000}$/[η] | 8.7 |
| $\eta_{10}/\eta_{1000}$ | 6.6 |
| Pencil hardness | H |
| Weight average molecular weight (Mw) | 96,700 |

(PC-3-1):

(Preparation of Polycarbonate Resin (PC-3-1))

To 37.6 kg (about 147 mol) of BPC (manufactured by HONSHU CHEMICAL INDUSTRY CO., LTD.) and 32.2 kg (about 150 mol) of diphenyl carbonate (DPC), an aqueous solution of cesium carbonate was added so that cesium carbonate would be 2 μmol per 1 mol of BPC to prepare a mixture. The mixture was charged into a first reactor having an internal volume of 200 L equipped with a stirring machine, a heat medium jacket, a vacuum pump and a reflux condenser. Then, an operation of reducing the pressure in the first reactor to 1.33 kPa (10 Torr) and recovering it to the atmospheric pressure with nitrogen was repeatedly carried out five times, and the interior of the first reactor was replaced with nitrogen. After replacement with nitrogen, a heat medium at a temperature of 230° C. was passed through the heat medium jacket to gradually increase the internal temperature of the first reactor thereby to dissolve the mixture. Then, the stirring machine was rotated at 300 rpm, and the temperature in the heat medium jacket was controlled to maintain the internal temperature of the first reactor at 220° C. Then, while phenol formed as a by-product by an oligomerization reaction of BPC and DPC carried out in the interior of the first reactor was distilled off, the pressure in the first reactor was reduced from 101.3 kPa (760 Torr) to 13.3 kPa (100 Torr) by the absolute pressure over a period of 40 minutes.

Then, the pressure in first reactor was maintained at 13.3 kPa, and while phenol was further distilled off, an ester exchange reaction was carried out for 80 minutes. The pressure in the system was recovered to 101.3 kPa by the absolute pressure with nitrogen, and then the pressure was elevated to 0.2 MPa by the gauge pressure, and the oligomer in the first reactor was pumped to a second reactor by means of a transfer pipe preliminarily heated to at least 200° C. The second reactor had an internal volume of 200 L, was provided with a stirring machine, a heat medium jacket, a vacuum pump and a reflux condenser, and had the internal pressure and the internal temperature controlled to be the atmospheric pressure and 240° C.

Then, the oligomer pumped to the second reactor was stirred at 38 rpm, the internal temperature was raised by the heat medium jacket, and the pressure in the second reactor was reduced from 101.3 kPa to 13.3 kPa by the absolute pressure over a period of 40 minutes. Then, the temperature raising was continued, and the internal pressure was reduced from 13.3 kPa to 399 Pa (3 Torr) by the absolute pressure further over a period of 40 minutes, and the distilled phenol was removed out of the system. Further, the temperature raising was continued, and after the absolute pressure in the second reactor reached 70 Pa (about 0.5 Torr), a pressure of 70 Pa was maintained, and a polycondensation reaction was carried out. The final internal temperature in the second reactor was 285° C. When the stirring machine of the second reactor achieved a preliminarily determined stirring power, the polycondensation reaction was completed. Then, the pressure in the second reactor was recovered to 101.3 kPa by the absolute pressure with nitrogen, and then the pressure was elevated to 0.2 MPa by the gauge pressure, and the polycarbonate resin was withdrawn from the bottom of the second reactor in the form of strands, which were pelletized by using a rotary cutter while cooling in a water tank. Physical properties of the obtained polycarbonate resin (PC-3-1) are shown below.

| | |
|---|---|
| Intrinsic viscosity [η] (dl/g) | 0.700 |
| Branch parameter G ([η]/[η]Iin) | 0.82 |
| $\ln\eta_{10}/[\eta]$ | 11.2 |
| $\ln\eta_{1000}/[\eta]$ | 8.7 |
| $\eta_{10}/\eta_{1000}$ | 5.8 |
| Pencil hardness | 2H |

(PC-3-2): NOVAREX M7027BF Manufactured by Mitsubishi Engineering-Plastics Corporation

| | |
|---|---|
| Intrinsic viscosity [η] (dl/g) | 0.559 |
| Branch parameter G ([η]/[η]Iin) | 0.88 |
| $\ln\eta_{10}/[\eta]$ | 14.5 |
| $\ln\eta_{1000}/[\eta]$ | 11.4 |
| $\eta_{10}/\eta_{1000}$ | 5.7 |
| Pencil hardness | 2B |
| (Mw/Mn) | 2.70 |

(PC-4-1):
(Preparation of Polycarbonate Resin (PC-4-1))

To 37.6 kg (about 147 mol) of BPC (manufactured by HONSHU CHEMICAL INDUSTRY CO., LTD.) and 32.2 kg (about 150 mol) of diphenyl carbonate (DPC), an aqueous solution of cesium carbonate was added so that cesium carbonate would be 2 μmol per 1 mol of BPC to prepare a mixture. The mixture was charged into a first reactor having an internal volume of 200 L equipped with a stirring machine, a heat medium jacket, a vacuum pump and a reflux condenser.

Then, an operation of reducing the pressure in the first reactor to 1.33 kPa (10 Torr) and recovering it to the atmospheric pressure with nitrogen was repeatedly carried out five times, and the interior of the first reactor was replaced with nitrogen. After replacement with nitrogen, a heat medium at a temperature of 230° C. was passed through the heat medium jacket to gradually increase the internal temperature of the first reactor thereby to dissolve the mixture. Then, the stirring machine was rotated at 300 rpm, and the temperature in the heat medium jacket was controlled to maintain the internal temperature of the first reactor at 220° C. Then, while phenol formed as a by-product by an oligomerization reaction of BPC and DPC carried out in the interior of the first reactor was distilled off, the pressure in the first reactor was reduced from 101.3 kPa (760 Torr) to 13.3 kPa (100 Torr) by the absolute pressure over a period of 40 minutes.

Then, the pressure in first reactor was maintained at 13.3 kPa, and while phenol was further distilled off, an ester exchange reaction was carried out for 80 minutes.

The pressure in the system was recovered to 101.3 kPa by the absolute pressure with nitrogen, and then the pressure was elevated to 0.2 MPa by the gauge pressure, and the oligomer in the first reactor was pumped to a second reactor by means of a transfer pipe preliminarily heated to at least 200° C. The second reactor had an internal volume of 200 L, was provided with a stirring machine, a heat medium jacket, a vacuum pump and a reflux condenser, and had the internal pressure and the internal temperature controlled to be the atmospheric pressure and 240° C.

Then, the oligomer pumped to the second reactor was stirred at 38 rpm, the internal temperature was raised by the heat medium jacket, and the pressure in the second reactor was reduced from 101.3 kPa to 13.3 kPa by the absolute pressure over a period of 40 minutes. Then, the temperature raising was continued, and the internal pressure was reduced from 13.3 kPa to 399 Pa (3 Torr) by the absolute pressure further over a period of 40 minutes, and the distilled phenol was removed out of the system. Further, the temperature raising was continued, and after the absolute pressure in the second reactor reached 70 Pa (about 0.5 Torr), a pressure of 70 Pa was maintained, and a polycondensation reaction was carried out. The final internal temperature in the second reactor was 285° C. When the stirring machine of the second reactor achieved a preliminarily determined stirring power, the polycondensation reaction was completed. On that occasion, the number of revaluations of stirring of the stirring machine was 6 revolutions per minute, and the reaction liquid temperature immediately before the completion of the reaction was 282° C., and the stirring power was 1.27 kW. Then, the pressure in the second reactor was recovered to 101.3 kPa by the absolute pressure with nitrogen, and then the pressure was elevated to 0.2 MPa by the gauge pressure, and the polycarbonate resin was withdrawn from the bottom of the second reactor in the form of strands, which were pelletized by using a rotary cutter while cooling in a water tank. Physical properties of the obtained polycarbonate resin (PC-4-1) are shown below.

| | |
|---|---|
| Intrinsic viscosity [η] (dl/g) | 0.700 |
| Branch parameter G ([η]/[η]Iin) | 0.82 |
| $\ln\eta_{10}/[\eta]$ | 11.2 |
| $\ln\eta_{1000}/[\eta]$ | 8.7 |
| $\eta_{10}/\eta_{1000}$ | 5.8 |
| Pencil hardness | 2H |

(PC-4-2):
(Preparation of Polycarbonate Resin (PC-4-2))

A polycarbonate resin was obtained in the same manner as in PC-4-1 except that the number of revolutions of the stirring machine and the predetermined stirring power of the second reactor were changed. On that occasion, the number of revolutions of stirring of the stirring machine was 16 revolutions per minute, the reaction liquid temperature immediately before completion of the reaction was 280° C., and the stirring power was 1.65 kW. Physical properties of the obtained polycarbonate resin (PC-4-2) are shown below.

| | |
|---|---|
| Intrinsic viscosity [η] (dl/g) | 0.540 |
| Branch parameter G ([η]/[η]Iin) | 0.89 |
| $\ln\eta_{10}/[\eta]$ | 12.8 |
| $\ln\eta_{1000}/[\eta]$ | 10.1 |
| $\eta_{10}/\eta_{1000}$ | 4.3 |
| Pencil hardness | 2H |

(PC-4-3): NOVAREX 7030PJ by Manufactured by Mitsubishi Engineering-Plastics Corporation

| | |
|---|---|
| Intrinsic viscosity [η] (dl/g) | 0.640 |
| Branch parameter G ([η]/[η]lin) | 1.00 |
| Pencil hardness | 2B |

(PC-4-4): NOVAREX 7022PJ by Manufactured by Mitsubishi Engineering-Plastics Corporation

| | |
|---|---|
| Intrinsic viscosity [η] (dl/g) | 0.470 |
| Branch parameter G ([η]/[η]lin) | 1.00 |
| Pencil hardness | 2B |

B. Flame Retardant

Metal sulfonate type flame retardant C4: Potassium perfluorobutane sulfonate (Bayowet C4 manufactured by Bayer Holding Ltd.)

Phosphorus-containing compound type flame retardant PX200: Aromatic condensed phosphate type flame retardant (PX200 manufactured by DAIHACHI CHEMICAL INDUSTRY CO., LTD.)

Phosphorus-containing compound type flame retardant FP110: Phosphazene derivative type flame retardant (FP110 manufactured by FUSHIMI Pharmaceutical Co., Ltd.)

Metal sulfonate type flame retardant F114P: Potassium perfluorobutane sulfonate (F114P manufactured by Bayer Holding Ltd.)

Halogen-containing compound type flame retardant FR53: Brominated polycarbonate resin type flame retardant (Iupilon FR FR53 manufactured by Mitsubishi Engineering-Plastics Corporation)

C. Mold Release Agent

Mold release agent H476: Pentaerythritol tetrastearate (UNISTER H-476 manufactured by NOF CORPORATION)

(I) Measurement of Melt Viscosity of Polycarbonate Resin

The melt viscosity of the polycarbonate resin was measured by using a capillary rheometer "Capirograph 1C" (manufactured by Toyo Seiki Seisaku-sho, Ltd.) equipped with a die of 1 mm in diameter×30 mm in length, with a retention time of the polycarbonate resin of 5 minutes at a measurement temperature of 300° C. within a range of the shear rate γ=9.12 sec$^{-1}$ to 1824 sec$^{-1}$. The polycarbonate resin was one preliminarily dried at 80° C. for 5 hours. As $\eta_{10}$ and $\eta_{1000}$ of the polycarbonate resin, the melt viscosity at a shear rate of 10 sec$^{-1}$ and the melt viscosity at a shear rate of 1000 sec$^{-1}$ were respectively read and regarded as the measured values.

(II) Evaluation of Polycarbonate Resin Composition

A. Flammability Test

Using the polycarbonate resin composition, test specimens having different thicknesses were injection-molded in accordance with UL standards by using an injection molding machine (SE100DU manufactured by Sumitomo Heavy Industries, Ltd.) at a cylinder temperature of from 260° C. to 280° C. for a molding cycle of 30 seconds, and the vertical flame test of UL standard 94 was carried out. With respect to the UL classes, "V-0" means that the specimen passed the classification V-0, "V-2" means that the specimen passed the classification V-2, and "V-2NG" means that the specimen did not pass the classification V-2.

Here, classifications V-0, V-1 and V-2 are evaluated by using five test specimens.

Specifically, a burner flame is applied to the lower end of a vertically held strip test specimen for 10 seconds and then the burner flame is moved away from the test specimen. If the flame subside, the burner flame is immediately applied further for 10 seconds and then moved away.

The classifications V-0, V-1 and V-2 are judged by the flaming duration after completion of the first and second flame application, the sum of the flaming duration after completion of the second flame application and the non-flaming combustion duration, the sum of the flaming duration of five test specimens, and presence or absence of flaming drips.

Both first time and second time, the classification V-0 is judged whether or not the flaming is completed within 10 seconds, and the classifications V-1 and V-2 within 30 seconds. Further, the classification V-0 is judged whether or not the flame subside with a sum of the second flaming duration and the non-flaming combustion duration within 30 seconds, and the classifications V-1 and V-2 within 60 seconds.

Further, the classification V-0 is judged whether or not the sum of the flaming duration of five test specimens is within 50 seconds, and the classifications V-1 and V-2 within 250 seconds. Further, flaming drips are allowed only in the classification V-2. All the test specimens are required not to be burned out.

B. Pencil Hardness

A plate of a polycarbonate resin composition of 3 mm in thickness×100 mm×100 mm was injection-molded by using an injection molding machine (J100SS-2 manufactured by Japan Steel Works, Ltd.) under conditions of a barrel temperature of 280° C. and a mold temperature of 90° C. With respect to the plate obtained by injection molding, the pencil hardness was measured in accordance with ISO 15184 by using a pencil hardness tester (manufactured by Toyo Seiki Seisaku-sho, Ltd.) at a load of 750 g.

C. Flow Value Q

The flow value Q of the polycarbonate resin composition was measured by using a Koka type flow tester (CFT-500A manufactured by Shimadzu Corporation) under conditions of 280° C. and 160 kg/cm$^2$ by using an orifice of 1 mm in diameter×10 mm with pre-heating for 7 minutes (unit: cm$^3$/sec).

D. Haze Test (Transparency)

By using a polycarbonate resin composition, a test specimen having a thickness of 3 mm was molded, and the haze of each of test specimens molded at molding temperatures of 280° C., 300° C. and 320° C. was measured by a haze meter.

Example 1-1 to 1-6

6 types of the polycarbonate resins (PC-1-1 to PC-1-6) having a melt viscosity ratio ($\eta_{10}/\eta_{1000}$) as shown in Table 1-1, a flame retardant and a mold release agent were blended and mixed in a composition as identified in Table 1-1 and kneaded by a twin screw extruder (TEX30XCT manufactured by Japan Steel Works, Ltd.) at a barrel temperature of 280° C. to prepare polycarbonate resin compositions. The obtained pellets were dried at 80° C. for 5 hours, and then in accordance with the above procedure, various test specimens were prepared to measure the flammability, the pencil hardness and the Q value. The results are shown in Table 1-1.

TABLE 1-1

| | | Ex. | | | | |
|---|---|---|---|---|---|---|
| | | 1-1 | 1-2 | 1-3 | 1-4 | 1-6 |
| Polycarbonate resin (production method) parts by weight | PC-1-1 (melt method) | 100 | — | — | — | — |
| | PC-1-2 (melt method) | — | 100 | — | — | — |
| | PC-1-3 (melt method) | — | — | 100 | 100 | — |
| | PC-1-5 (melt method) | — | — | — | — | 50 |
| | PC-1-6 (melt method) | — | — | — | — | 50 |
| (Resin) $\eta_{10}/\eta_{1000}$ | | 4.6 | 4.9 | 7.9 | 7.9 | 3.2 |
| Flame retardant C4: part by weight | | 0.1 | 0.1 | 0.1 | 0.06 | 0.1 |
| Mold release agent H476: part by weight | | 0.1 | 0.1 | 0.1 | 0.1 | 0.1 |
| (Resin composition) pencil hardness | | 2H | 2H | 2H | 2H | HB |
| Flammability test thickness (mm) when V-0 achieved | | 1.5 | 1.2 | 1.0 | 1.5 | 2.0 |
| Q (cm²/sec) | | 15 | 9 | 6 | 6 | 7 |
| Haze test | Molding temperature: 300° C. | 1.0 | 1.0 | 1.0 | 0.7 | 0.8 |

Comparative Examples 1-2 to 1-5

Further, as Comparative Examples, 5 types of polycarbonate resins (PC-1-6 to PC-1-9) having a melt viscosity ratio ($\eta_{10}/\eta_{1000}$) as shown in Table 1-2, a flame retardant and a mold release agent were blended and mixed in a composition as identified in Table 1-2, and polycarbonate resin compositions were prepared in the same manner as in Example 1-1. The obtained pellets were dried at 120° C. for 5 hours, and in accordance with the above procedure, various test specimens were prepared to measure the flammability, the pencil hardness and the Q value. The results are shown in Table 1-2.

TABLE 1-2

| | | Comp. Ex. | | | |
|---|---|---|---|---|---|
| | | 1-2 | 1-3 | 1-4 | 1-5 |
| Polycarbonate resin (production method) parts by weight | PC-1-6 (melt method) | 100 | — | — | — |
| | PC-1-9 (melt method) | — | 100 | — | — |
| | PC-1-10 (interfacial method) | — | — | 100 | — |
| | PC-1-11 (interfacial method) | — | — | — | 100 |
| (Resin) $\eta_{10}/\eta_{1000}$ | | 2.8 | 5.2 | 2.3 | 8.8 |
| Flame retardant C4: part by weight | | 0.1 | 0.1 | 0.1 | 0.1 |
| Mold release agent H476: part by weight | | 0.1 | 0.1 | 0.1 | 0.1 |
| (Resin composition) pencil hardness | | 2B | 2B | 2B | 2H |
| Flammability test thickness (mm) when V-0 achieved | | 3.0 | 2.0 | 3.0 | 2.0 |
| Q (cm²/sec) | | 9 | 4 | 8 | 1.5 |
| Haze test | molding temperature: 300° C. | 0.7 | 0.7 | 0.7 | 0.7 |

The flame retardant and the mold release agent in Table 1-2 are the same as in the above-described Table 1-1.

From the results shown in Tables 1-1 and 1-2, polycarbonate resins (Examples 1-1 to 1-6) which comprise a combination of a composition having a polycarbonate resin having a specific branch parameter G and a specific melt viscosity ratio and a flame retardant, and a flame retardant, and which have a pencil hardness of at least HB, have a thickness when V-0 achieved of at most 2 mm in the flammability test, and have a flow value Q of at least 6 (cm³/sec) by the Koka type flow tester. Accordingly, they are found to have good balance between the flame retardancy and the moldability as compared with resin compositions (Comparative Examples 1-2 to 1-5) having no such constitution.

Examples 2-1 to 2-6 and Comparative Examples 2-1 to 2-4

The polycarbonate resins (PC-2-1) prepared by the above-described melt method, the polycarbonate resin (PC-2-8) prepared by the interfacial method and other polycarbonate resins (PC-2-2, PC-2-3 and PC-2-4), a flame retardant and a mold release agent were blended and mixed in a composition as shown in Table 2-1, and kneaded by a twin screw extruder (TEX30HSST manufactured by Japan Steel Works, Ltd.) at a barrel temperature of 280° C. to prepare polycarbonate resin compositions. The obtained pellets were dried at 120° C. for 5 hours, and then in accordance with the above procedure, various test specimens were prepared to measure the flammability, the pencil hardness and the transparency. The results are shown in Table 2-1.

TABLE 2-1

| | | Ex. | | | | | | Comp. Ex. | | | |
|---|---|---|---|---|---|---|---|---|---|---|---|
| | | 2-1 | 2-2 | 2-3 | 2-4 | 2-5 | 2-6 | 2-1 | 2-2 | 2-3 | 2-4 |
| Polycarbonate resin (production method) parts by weight | PC-2-1 (melt method) | 100 | 70 | 20 | 20 | 100 | — | — | — | — | — |
| | PC-2-2 | — | — | — | — | — | — | — | 70 | 20 | 10 |
| | PC-2-3 | — | — | 50 | 50 | — | 50 | 70 | — | 50 | 60 |
| | PC-2-4 | — | 30 | 30 | 30 | — | 30 | 30 | 30 | 30 | 30 |
| | PC-2-8 (interfacial method) | — | — | — | — | — | 20 | — | — | — | — |
| Flame retardant C4: part by weight | | 0.08 | 0.08 | 0.08 | 0.12 | 0.2 | 0.08 | 0.08 | 0.08 | 0.08 | 0.08 |
| Mold release agent H476: part by weight | | 0.1 | 0.1 | 0.1 | 0.1 | 0.1 | 0.1 | 0.1 | 0.1 | 0.1 | 0.1 |
| Flammability test | 2.0 mmt | V-0 | V-0 | V-0 | V-0 | V-0 | — | V-0 | V-0 | V-0 | V-0 |
| | 1.5 mmt | V-0 | V-0 | V-0 | V-0 | V-0 | V-1 | V-0 | V-2 | V-2 | V-2 |

TABLE 2-1-continued

|  |  | Ex. | | | | | | Comp. Ex. | | | |
|---|---|---|---|---|---|---|---|---|---|---|---|
|  |  | 2-1 | 2-2 | 2-3 | 2-4 | 2-5 | 2-6 | 2-1 | 2-2 | 2-3 | 2-4 |
|  | 1.0 mmt | V-0 | V-0 | V-2 | V-2 | V-0 | V-1 | V-2 | V-2 | V-2 | V-2 |
|  | 0.8 mmt | V-0 | V-0 | V-2 | V-2 | V-0 | — | V-2 | V-2 | V-2 | V-2 |
|  | (Resin composition) pencil hardness | 2H | H | HB | HB | 2H | F | 2B | H | HB | B |
| Haze test | Molding temperature: 280° C. | 20 | 16 | 10 | 20 | 40 | — | 0.6 | 0.6 | 0.6 | 0.6 |
|  | Molding temperature: 300° C. | 4 | 4 | 3 | 6 | 10 | — | 0.6 | 0.6 | 0.6 | 0.6 |
|  | Molding temperature: 320° C. | 0.6 | 0.6 | 0.6 | 0.6 | 2 | — | 0.6 | 0.6 | 0.6 | 0.6 |

From the results shown in Table 2-1, by comparison among Example 2-1, Example 2-2 and Comparative Example 2-1, it is found that in Examples 2-1 and 2-2, polycarbonate resin compositions having improved flame retardancy and pencil hardness while suppressing a decrease in the transparency can be obtained. Further, by comparison between Example 2-2 and Comparative Example 2-2, it is found that although the resin compositions have the same pencil hardness, the results of the flammability test is better in Example 2-2. The same is found by comparison between Example 2-3 and Comparative Example 2-3.

Examples 2-7 to 2-9 and Comparative Example 2-5

The above-described polycarbonate resin (PC-2-6) and other polycarbonate resins (PC-2-3 and PC-2-7), a flame retardant and a mold release agent were blended and mixed in a composition as shown in Table 2-2, and kneaded by a twin screw extruder (TEX30HSST manufactured by Japan Steel Works, Ltd.) at a barrel temperature of 280° C. to prepare polycarbonate resin compositions. The obtained pellets were dried at 120° C. for 5 hours, and then in accordance with the above procedure, various test specimens were prepared to measure the flammability, the pencil hardness, the deflection temperature under load (DTUL) and the transparency. The results are shown in Table 2-2.

E. Deflection Temperature Under Load (DTUL)

The pellets of each of the polycarbonate resin compositions shown in Table 2-2 were dried by a dryer at 100° C. for 3 hours, and molded into multipurpose test specimen A type molded specimen in accordance with ISO 3167 by using an injection molding machine (IS-80EPN manufactured by TOSHIBA MACHINE CO., LTD.) at an injection speed of 200 mm/sec under a dwell of 70 MPa for an injection and dwell time of 20 seconds for a cooling time of 20 seconds at a mold temperature of 120° C. at a molten resin temperature of 330° C. Using a test specimen of 80 mm×10 mm×4 mm cut from the obtained molded specimen, in accordance with ISO 75, the deflection temperature under load (DTUL, unit: ° C.) under a load of 1.80 MPa was measured by a flatwise method. The higher the value, the better the heat resistance. The results are shown in Table 2-2.

TABLE 2-2

|  |  | Ex. | | | Comp. Ex. |
|---|---|---|---|---|---|
|  |  | 2-7 | 2-8 | 2-9 | 2-5 |
| Poly- | PC-2-6 | 100 | 70 | 100 | — |
| carbonate | (melt method) | | | | |
| resin | PC-2-3 | — | — | — | 70 |
| (production | PC-2-7 | — | 30 | — | 30 |
| method) parts | (interfacial | | | | |
| by weight | method) | | | | |
| Flame retardant C4: part by weight | | 0.08 | 0.08 | 0.2 | 0.08 |
| Mold release agent H476: part by weight | | 0.1 | 0.1 | 0.1 | 0.1 |
| Flammability | 2.0 mmt | V-0 | V-0 | V-0 | V-0 |
| test | 1.5 mmt | V-0 | V-0 | V-0 | V-2 |
| (Resin composition) pencil hardness | | 2H | F | 2H | 2B |
| DTUL (° C.) (ISO: 1.80 MPa) | | 160 | 150 | 160 | 122 |
| Haze test | Molding temperature: 300° C. | 0.6 | 0.6 | 1 | 0.6 |

From the results shown in Table 2-2, among polycarbonate resins having structural units represented by the formula (1) in its molecule, by compositions (Examples 2-7 to 2-9) having a polycarbonate resin having structural units derived from 2,2-bis(4-hydroxy-3,5-dimethylphenyl)propane and a flame retardant blended, molded articles having improved heat resistance can be obtained.

Examples 3-1 to 3-3 and Comparative Examples 3-1 and 3-2

The polycarbonate resin (PC-3-1) prepared by the above-described melt method, another polycarbonate resin (PC-3-2) and a flame retardant were blended and mixed in a composition as shown in Table 3-1, and kneaded by a twin screw extruder (TEX30HSST manufactured by Japan Steel Works, Ltd.) at a barrel temperature of 280° C. to prepare polycarbonate resin compositions. The obtained pellets were dried at 120° C. for 5 hours, and then in accordance with the above procedure, various test specimens were prepared to measure the flammability, the pencil hardness and the haze. The results are shown in Table 3-1.

TABLE 3-1

|  |  | Ex. | | | Comp. Ex. | |
|---|---|---|---|---|---|---|
|  |  | 3-1 | 3-2 | 3-3 | 3-1 | 3-2 |
| Polycarbonate resin | PC-3-1 (melt method) | 80 | 20 | 80 | — | — |
| (production method) | PC-3-2 | 20 | 80 | 20 | 100 | 100 |
| parts by weight | | | | | | |
| Flame retardant PX200: part by weight | | 11.1 | — | — | 11.1 | — |
| Flame retardant FP110: part by weight | | — | 11.1 | 11.1 | — | 11.1 |
| (Resin composition) pencil hardness | | 2H | HB | 2H | 2B | 2B |

TABLE 3-1-continued

|  |  | Ex. | | | Comp. Ex. | |
| --- | --- | --- | --- | --- | --- | --- |
|  |  | 3-1 | 3-2 | 3-3 | 3-1 | 3-2 |
| Flammability test | 1.5 mmt | V-1 | V-1 | V-0 | V-2 | V-2 |
| Haze test | Molding temperature: 300° C. | 1.2 | 0.9 | 1.2 | 0.7 | 0.7 |

Examples 4-1 to 4-6 and Comparative Examples 4-1 to 4-2

The polycarbonate resins (PC-4-1 and PC-4-2) prepared by the above-described melt method, other polycarbonate resins (PC-4-3 and PC-4-4) and a flame retardant were blended and mixed in a composition as shown in Table 4-1, and kneaded by a twin screw extruder (TEX30HSST manufactured by Japan Steel Works, Ltd.) at a barrel temperature of 280° C. to prepare polycarbonate resin compositions. The obtained pellets were dried at 120° C. for 5 hours, and then in accordance with the above procedure, various test specimens were prepared to measure the flammability, the pencil hardness and the transparency. The results are shown in Table 4-1.

TABLE 4-1

|  |  | Ex. | | | | | | Comp. Ex. | |
| --- | --- | --- | --- | --- | --- | --- | --- | --- | --- |
|  |  | 4-1 | 4-2 | 4-3 | 4-4 | 4-5 | 4-6 | 4-1 | 4-2 |
| Polycarbonate resin (production method) parts by weight | PC-4-1 (melt method) | 10.5 | 20.9 | 31.4 | 20.1 | 40.3 | 59.8 | — | — |
|  | PC-4-2 (melt method) | 10.5 | 20.9 | 31.4 | — | — | — | — | — |
|  | PC-4-3 | — | — | — | 79.9 | 59.7 | 40.2 | — | 100 |
|  | PC-4-4 | 79.0 | 58.0 | 37.2 | — | — | — | 100 | — |
| Flame retardant F114P: part by weight | | 0.06 | 0.06 | 0.06 | 0.06 | 0.06 | 0.06 | 0.06 | 0.06 |
| Flame retardant FR53: part by weight | | 16.3 | 16.3 | 16.3 | 29.9 | 29.9 | 29.9 | 16.3 | 29.9 |
| (Resin composition) pencil hardness | | HB | F | H | HB | F | H | B | B |
| Flammability test | | 1.2 mmt V-0 | 1.0 mmt V-0 | 0.8 mmt V-0 | 0.5 mmt V-0 | 0.5 mmt V-0 | 0.4 mmt V-0 | 1.5 mmt V-2 | 0.8 mmt V-2 |
| Haze test | Molding temperature: 300° C. | 0.9 | 1.0 | 1.4 | 0.9 | 1.0 | 1.4 | 0.7 | 0.7 |

From the results shown in Tables 3-1 and 4-1, by compositions having a polycarbonate resin having a specific branch parameter G and a specific melt viscosity ratio and a flame retardant blended, molded articles having excellent flame retardancy, a high hardness and a favorable color can be obtained.

Industrial Applicability

A molded article obtainable from the polycarbonate resin composition of the present invention is excellent in the flame retardancy, and has a high hardness and improved moldability, and is useful for chassis for precision instruments, housing for home electric appliances, exterior members, building materials and the like.

What is claimed is:

1. A branched polycarbonate resin, which has:
   a ratio of the melt viscosity $\eta_{10}$ measured at 300° C. at a shear rate of 10 sec$^{-1}$ to the melt viscosity $\eta_{1000}$ measured at 300° C. at a shear rate of 1,000 sec$^{-1}$ ($\eta_{10}/\eta_{1000}$) of at least 3 and at most 8;
   a branch parameter G=$[\eta]/[\eta]_{lin}$ of at least 0.80 and at most 0.94; and
   a pencil hardness of at least HB,
   wherein:
   [$\eta$] represents the intrinsic viscosity (dl/g) of the branched polycarbonate resin in a methylene chloride solvent at 20° C.; and
   $[\eta]_{lin}$ represents the intrinsic viscosity in a methylene chloride solvent at 20° C. of a linear polycarbonate having the same weight average molecular weight as the branched polycarbonate resin as measured by a GPC method with a general purpose calibration curve.

2. The polycarbonate resin according to claim 1, comprising at least one structural unit represented by formula (1):

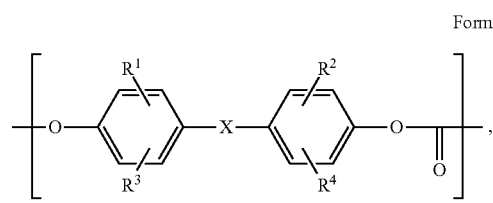

Formula (1)

wherein:
X represents a single bond, a substituted or non-substituted alkylene group, a substituted or non-substituted alkylidene group, an oxidized or non-oxidized sulfur atom, or an oxygen atom;
$R^1$ and $R^2$ independently represent a substituted or non-substituted $C_{1-20}$ alkyl group or a substituted or non-substituted aryl group; and
$R^3$ and $R^4$ independently represent a hydrogen atom, a substituted or non-substituted $C_{1-20}$ alkyl group, or a substituted or non-substituted aryl group.

3. The polycarbonate resin according to claim 2, wherein, in the formula (1):

each of $R^1$ and $R^2$ independently represent a methyl group bonded to the carbon atom at the 2-position of the phenoxy group;
each of $R^3$ and $R^4$ independently represent a hydrogen atom bonded to the carbon atom at the 6-position of the phenoxy group; and
X represents an isopropylidene group.

4. The polycarbonate resin according to claim 1, comprising at least one structural unit represented by formula (2):

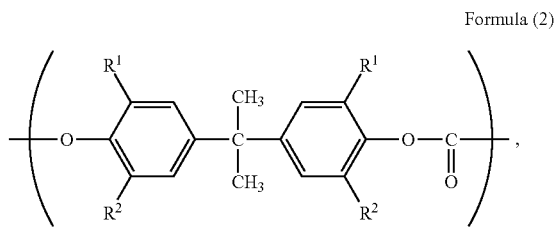

Formula (2)

wherein $R^1$ and $R^2$ independently represent a substituted or non-substituted $C_{1-20}$ alkyl group, or a substituted or non-substituted aryl group.

5. The polycarbonate resin according to claim 1, which is obtained by ester exchange of an aromatic dihydroxy compound represented by formula (3) and a carbonic diester:

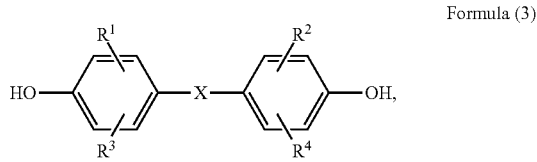

Formula (3)

wherein:
X represents a single bond, a substituted or non-substituted alkylene group, a substituted or non-substituted alkylidene group, an oxidized or non-oxidized sulfur atom, or an oxygen atom;
$R^1$ and $R^2$ independently represent a substituted or non-substituted $C_{1-20}$ alkyl group or a substituted or non-substituted aryl group; and
$R^3$ and $R^4$ independently represent a hydrogen atom, a substituted or non-substituted $C_{1-20}$ alkyl group, or a substituted or non-substituted aryl group.

6. A polycarbonate resin composition, comprising:
(i) the polycarbonate resin of claim 1; and
(ii) a polycarbonate resin comprising at least one structural unit represented by formula (4):

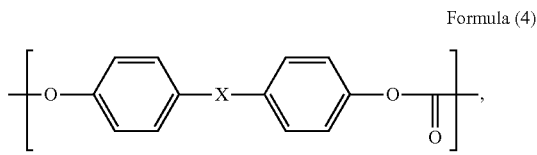

Formula (4)

wherein X represents a single bond, a substituted or non-substituted alkylene group, a substituted or non-substituted alkylidene group, an oxidized or non-oxidized sulfur atom, or an oxygen atom.

7. The polycarbonate resin composition according to claim 6, comprising from 1 to 45 wt % of the polycarbonate resin (i), based on a total weight of the polycarbonate resin composition.

8. A flame retardant-containing polycarbonate resin composition, comprising the polycarbonate resin of claim 1 and a flame retardant.

9. The flame retardant-containing polycarbonate resin composition according to claim 8, wherein the flame retardant is at least one selected from the group consisting of a metal sulfonate flame retardant, a halogen-containing compound flame retardant, and a phosphorus-containing compound flame retardant.

10. The flame retardant-containing polycarbonate resin composition according to claim 9, comprising from 0.04 to 0.3 part by weight of the metal sulfonate flame retardant per 100 parts by weight of the polycarbonate resin.

11. The flame retardant-containing polycarbonate resin composition according to claim 9, comprising from 5 to 30 parts by weight of the halogen-containing compound flame retardant per 100 parts by weight of the polycarbonate resin.

12. The flame retardant-containing polycarbonate resin composition according to claim 9, comprising from 3 to 15 parts by weight of the phosphorous-containing compound flame retardant per 100 parts by weight of the polycarbonate resin.

13. A flame retardant-containing polycarbonate resin composition, comprising the polycarbonate resin composition of claim 6 and a flame retardant.

14. The flame retardant-containing polycarbonate resin composition according to claim 13, wherein the flame retardant is at least one selected from the group consisting of a metal sulfonate flame retardant, a halogen-containing compound flame retardant, and a phosphorus-containing compound flame retardant.

15. The flame retardant-containing polycarbonate resin composition according to claim 14, comprising from 0.04 to 0.3 part by weight of the metal sulfonate flame retardant per 100 parts by weight of the polycarbonate resin composition.

16. The flame retardant-containing polycarbonate resin composition according to claim 14, comprising from 5 to 30 parts by weight of the halogen-containing compound flame retardant per 100 parts by weight of the polycarbonate resin composition.

17. The flame retardant-containing polycarbonate resin composition according to claim 14, comprising from 3 to 15 parts by weight of the phosphorous-containing compound flame retardant per 100 parts by weight of the polycarbonate resin composition.

18. A molded article of polycarbonate resin obtained by molding the flame retardant-containing polycarbonate resin composition of claim 8, whereing the molded article:
satisfies the V-0 classification in the flammability test of UL94 with respect to a test specimen having a thickness of at most 2 mm;
has a haze of at most 1.0 with respect to a test specimen having a thickness of 3 mm based on the standard of JIS K7136; and
has a surface hardness of at least HB.

19. A molded article of polycarbonate resin obtained by molding the flame retardant-containing polycarbonate resin composition of claim 13, wherein the molded article:
satisfies the V-0 classification in the flammability test of UL94 with respect to a test specimen having a thickness of at most 2 mm;
has a haze of at most 1.0 with respect to a test specimen having a thickness of 3 mm based on the standard of JIS K7136; and
has a surface hardness of at least HB.

* * * * *